Oct. 3, 1967　　　　　　A. J. GRINER　　　　　3,344,580
MACHINE FOR MAKING AND LOADING PAPER CUPS
Filed Oct. 15, 1965　　　　　　　　　　　　21 Sheets-Sheet 1
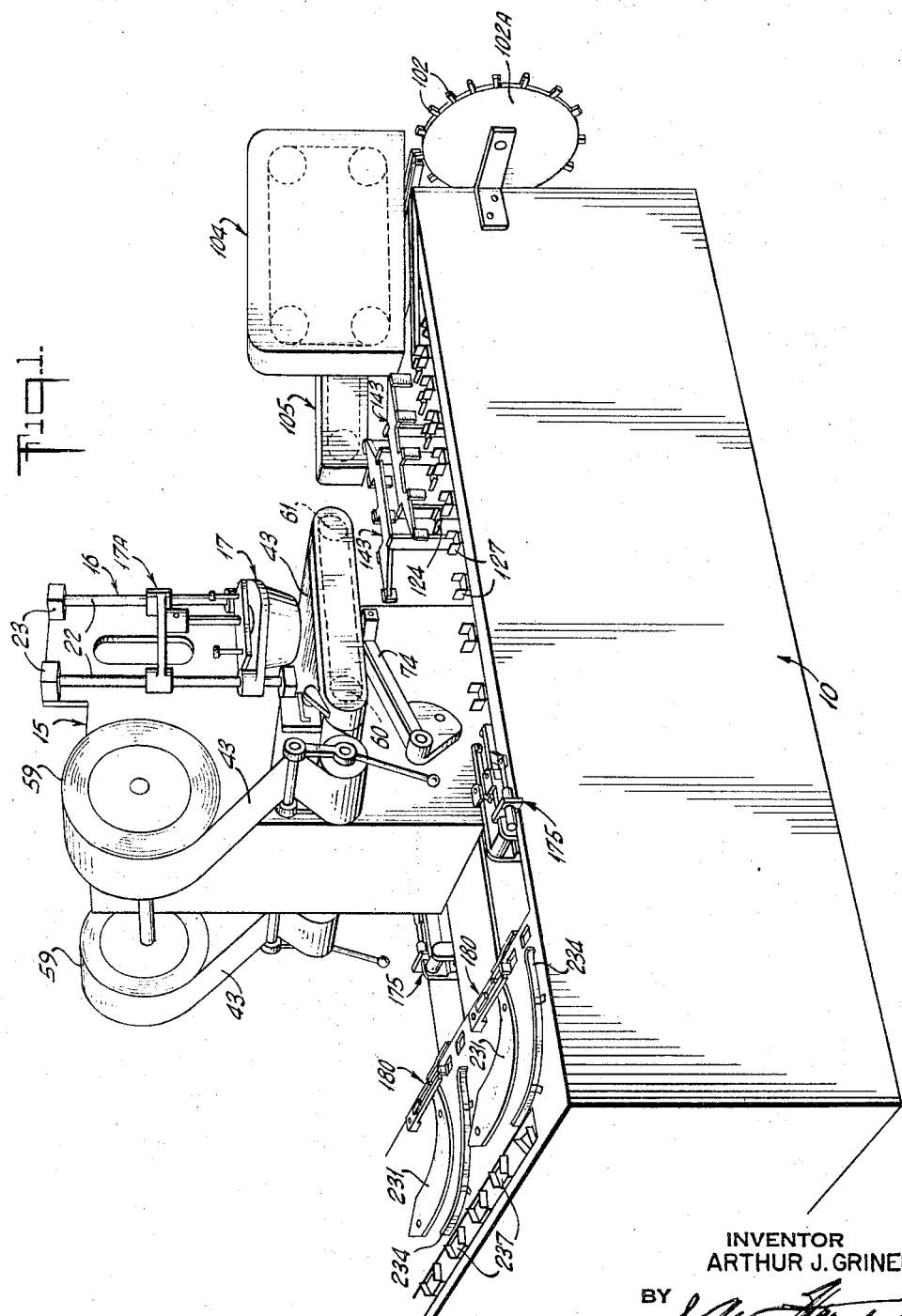
INVENTOR
ARTHUR J. GRINER
BY 
PATENT AG'T.

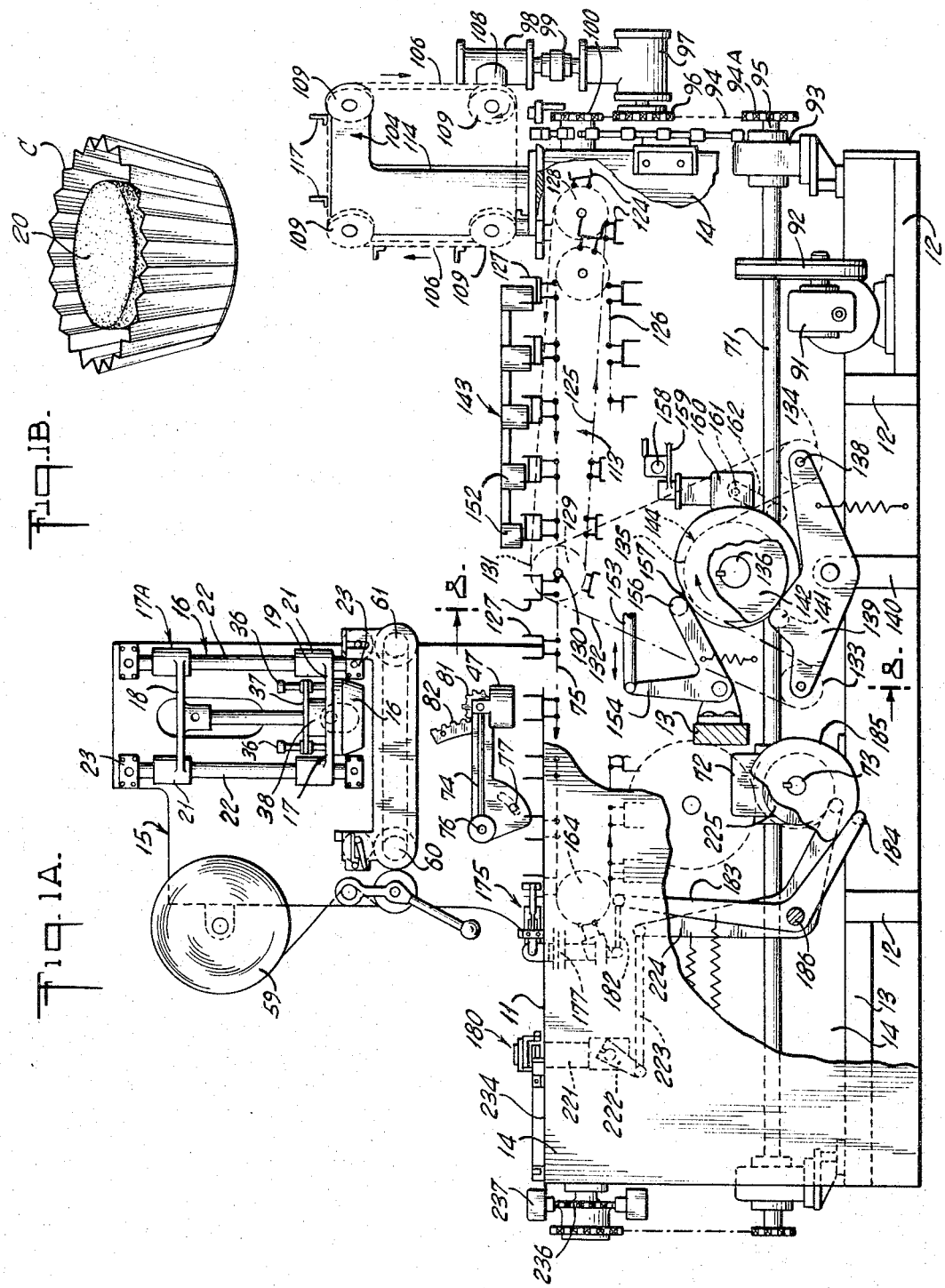

Oct. 3, 1967  A. J. GRINER  3,344,580
MACHINE FOR MAKING AND LOADING PAPER CUPS
Filed Oct. 15, 1965  21 Sheets-Sheet 3
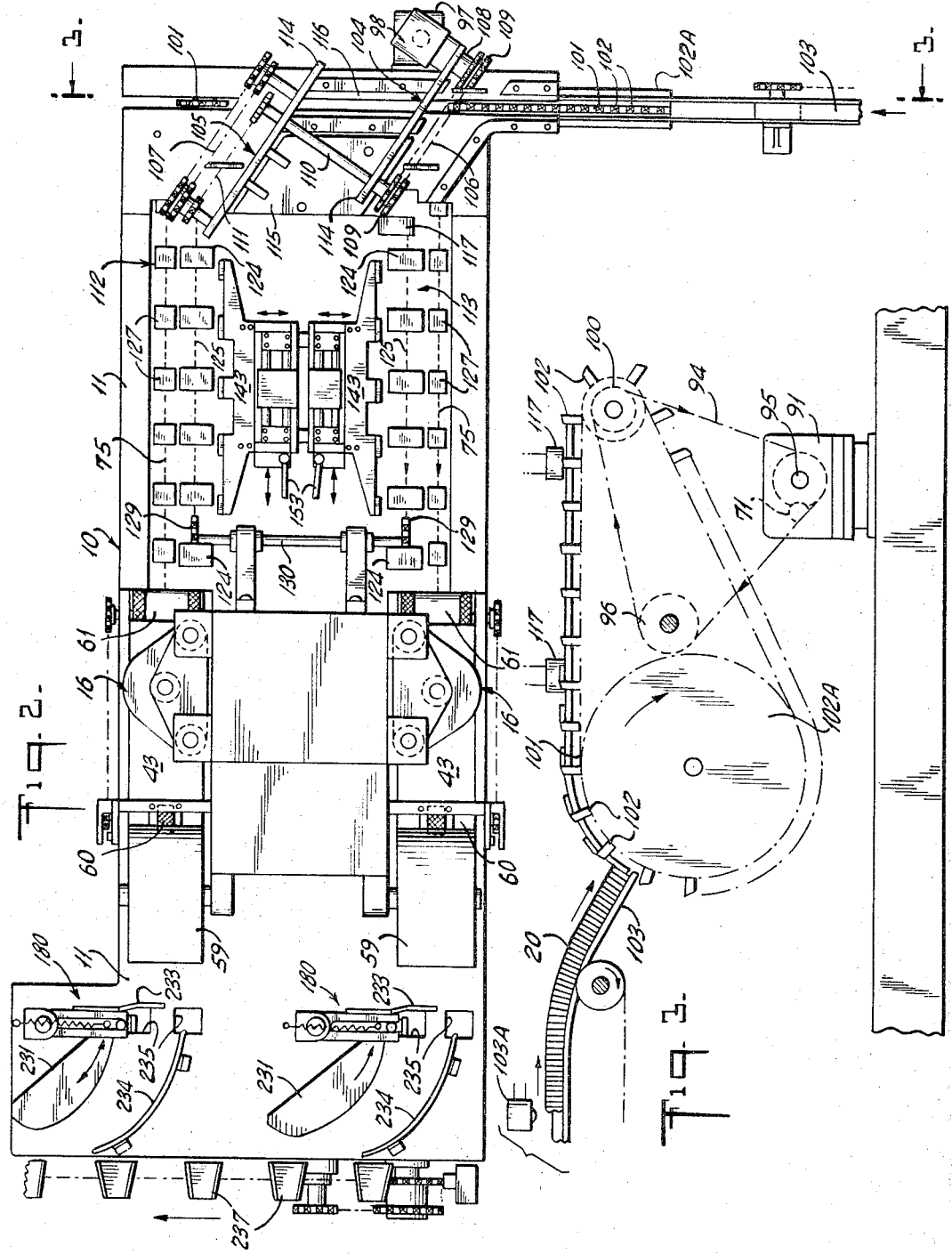
INVENTOR
ARTHUR J. GRINER
BY
PATENT AG'T.

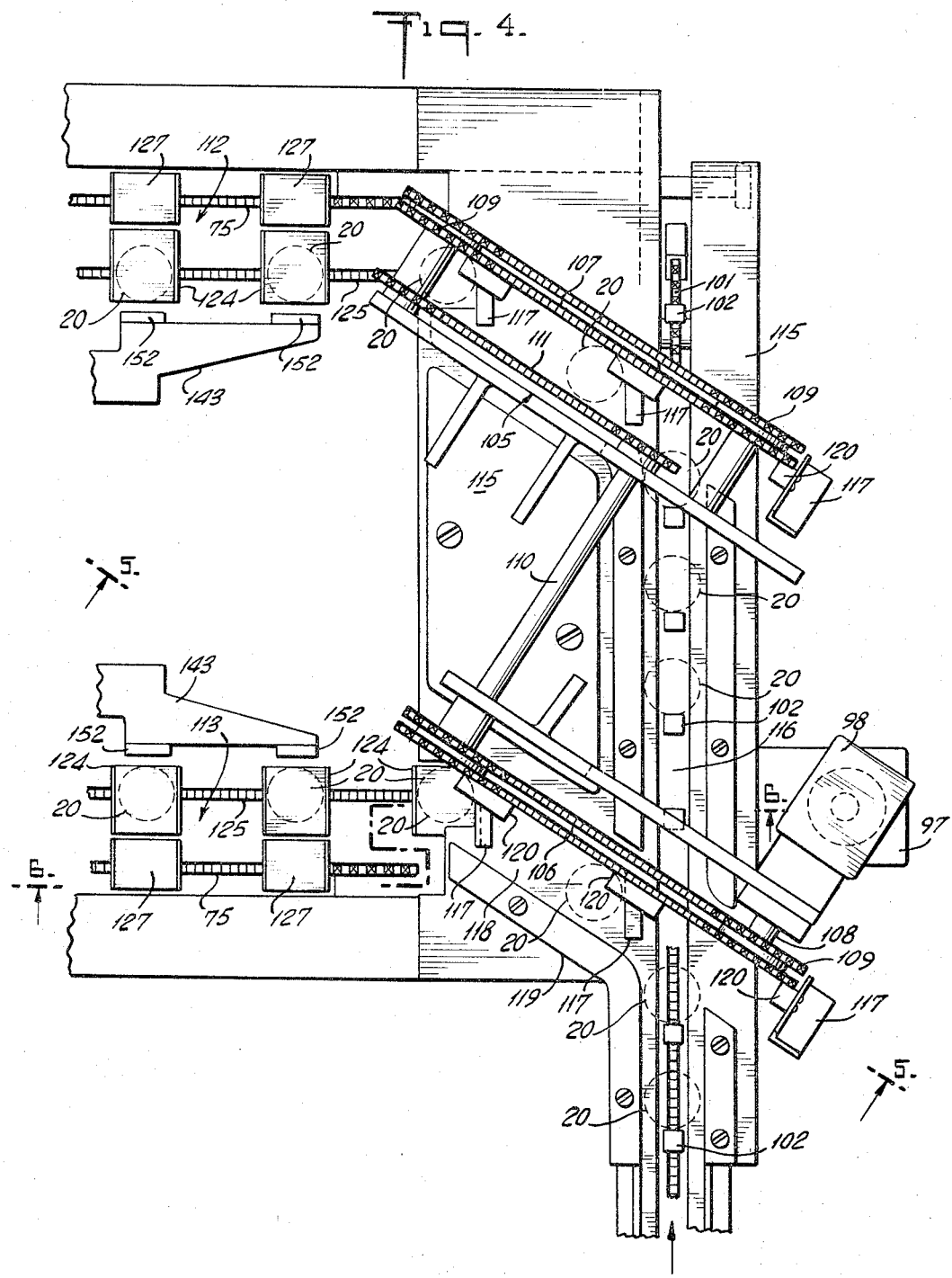

Oct. 3, 1967                     A. J. GRINER                    3,344,580
                    MACHINE FOR MAKING AND LOADING PAPER CUPS
Filed Oct. 15, 1965                                      21 Sheets-Sheet 5
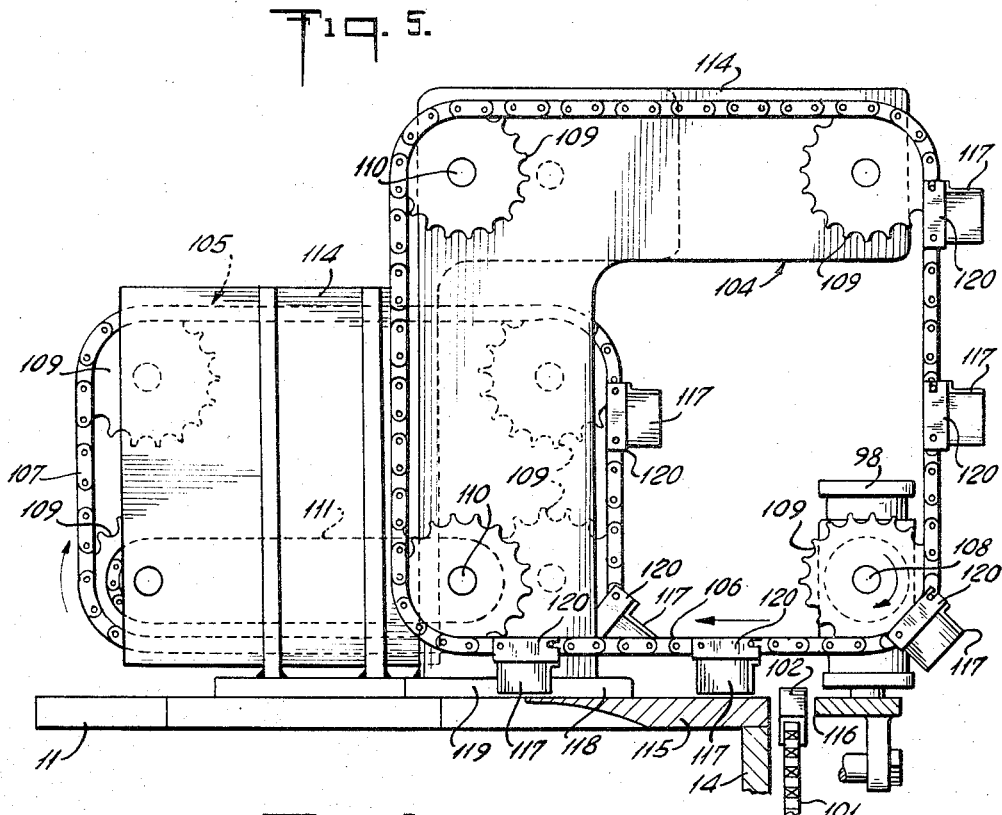
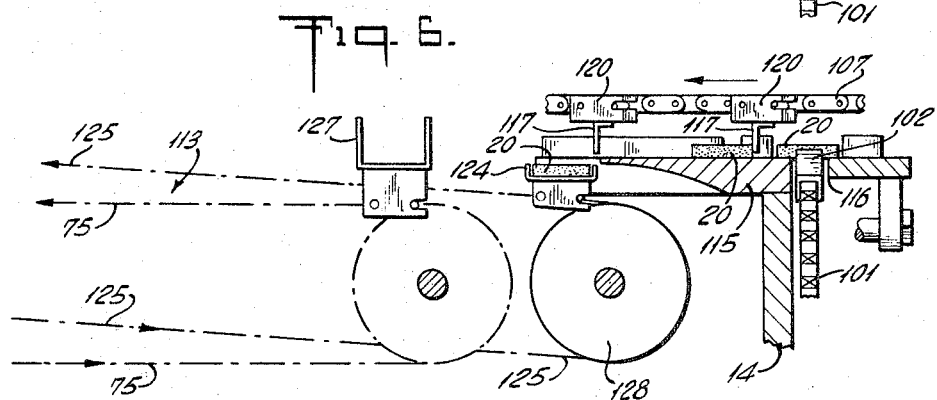
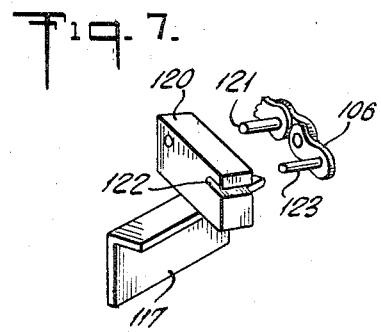
INVENTOR
ARTHUR J. GRINER
PATENT AG'T.

Oct. 3, 1967  A. J. GRINER  3,344,580
MACHINE FOR MAKING AND LOADING PAPER CUPS
Filed Oct. 15, 1965  21 Sheets-Sheet 6
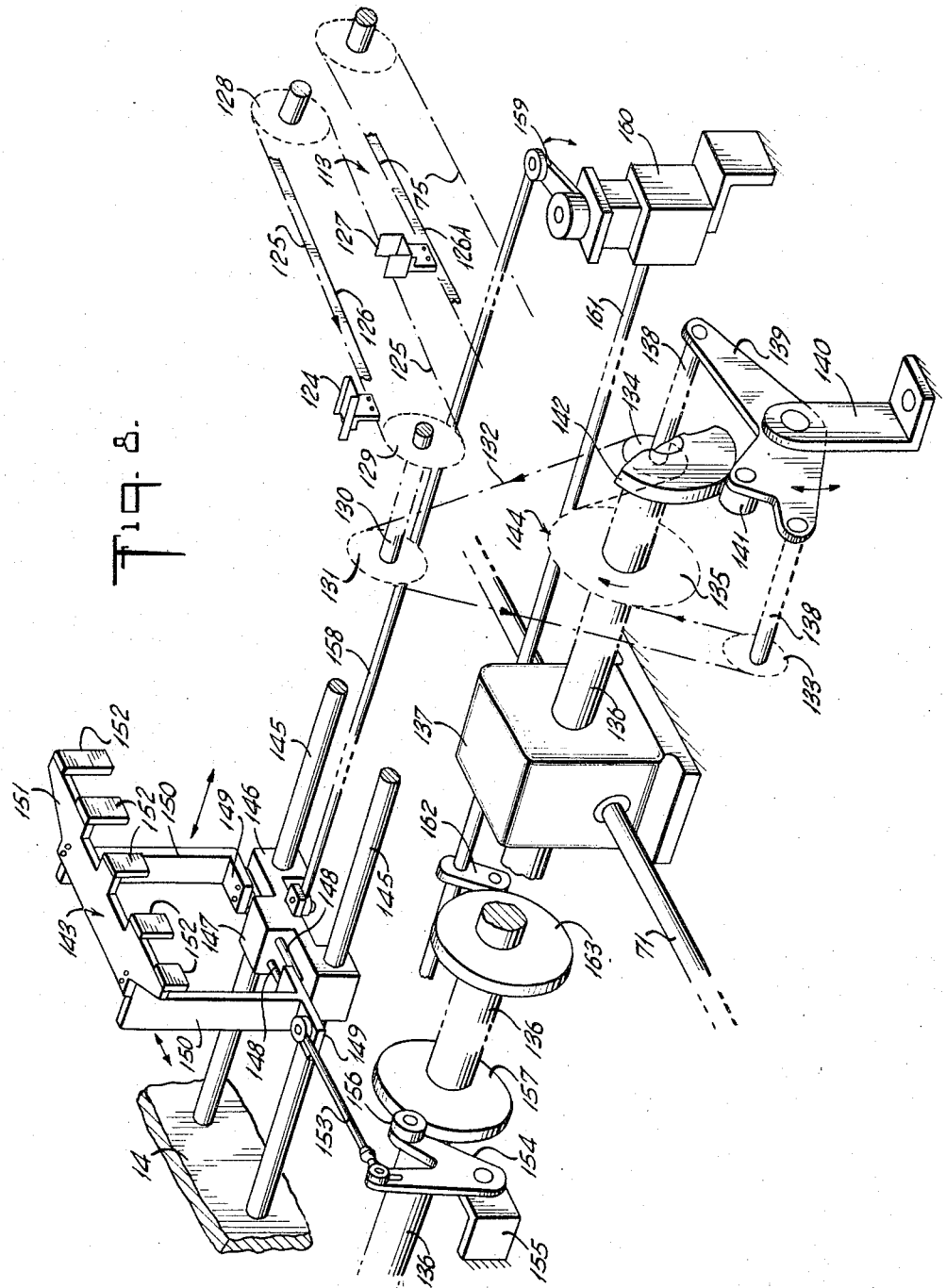
INVENTOR
ARTHUR J. GRINER
BY 
PATENT AG'T.

Oct. 3, 1967  A. J. GRINER  3,344,580
MACHINE FOR MAKING AND LOADING PAPER CUPS
Filed Oct. 15, 1965  21 Sheets-Sheet 7
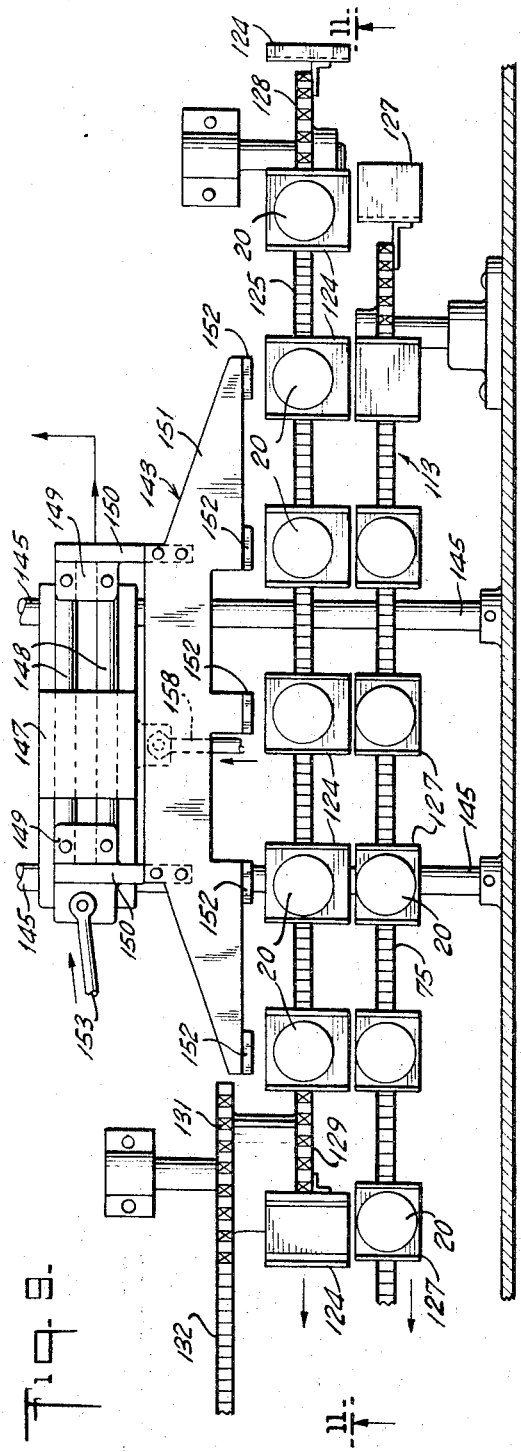
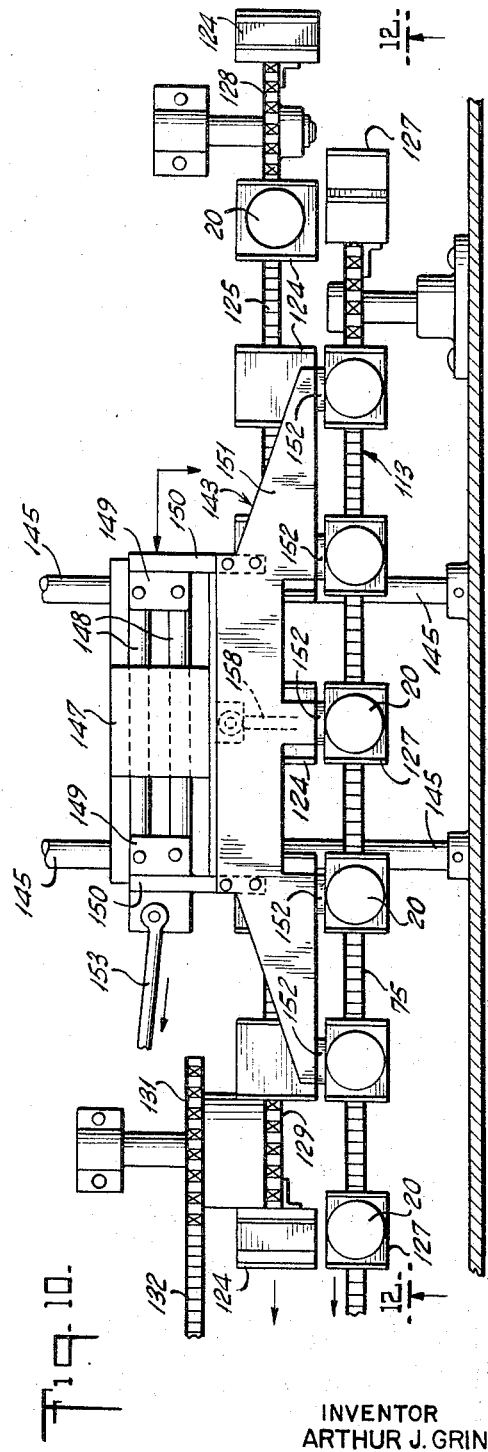
INVENTOR
ARTHUR J. GRINER
BY 
PATENT AG'T.

Oct. 3, 1967  A. J. GRINER  3,344,580
MACHINE FOR MAKING AND LOADING PAPER CUPS
Filed Oct. 15, 1965  21 Sheets-Sheet 8
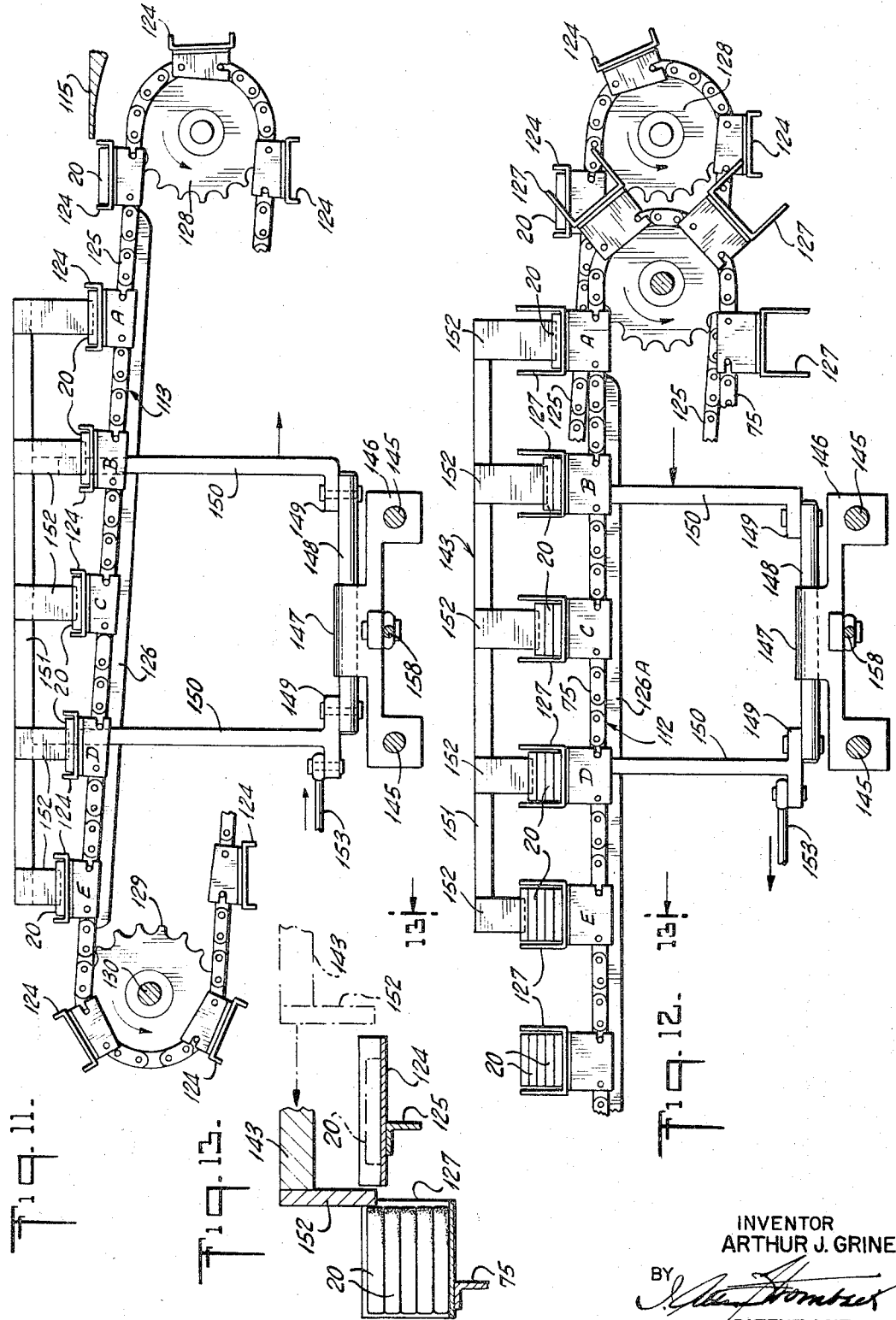
INVENTOR
ARTHUR J. GRINER
BY
PATENT AG'T.

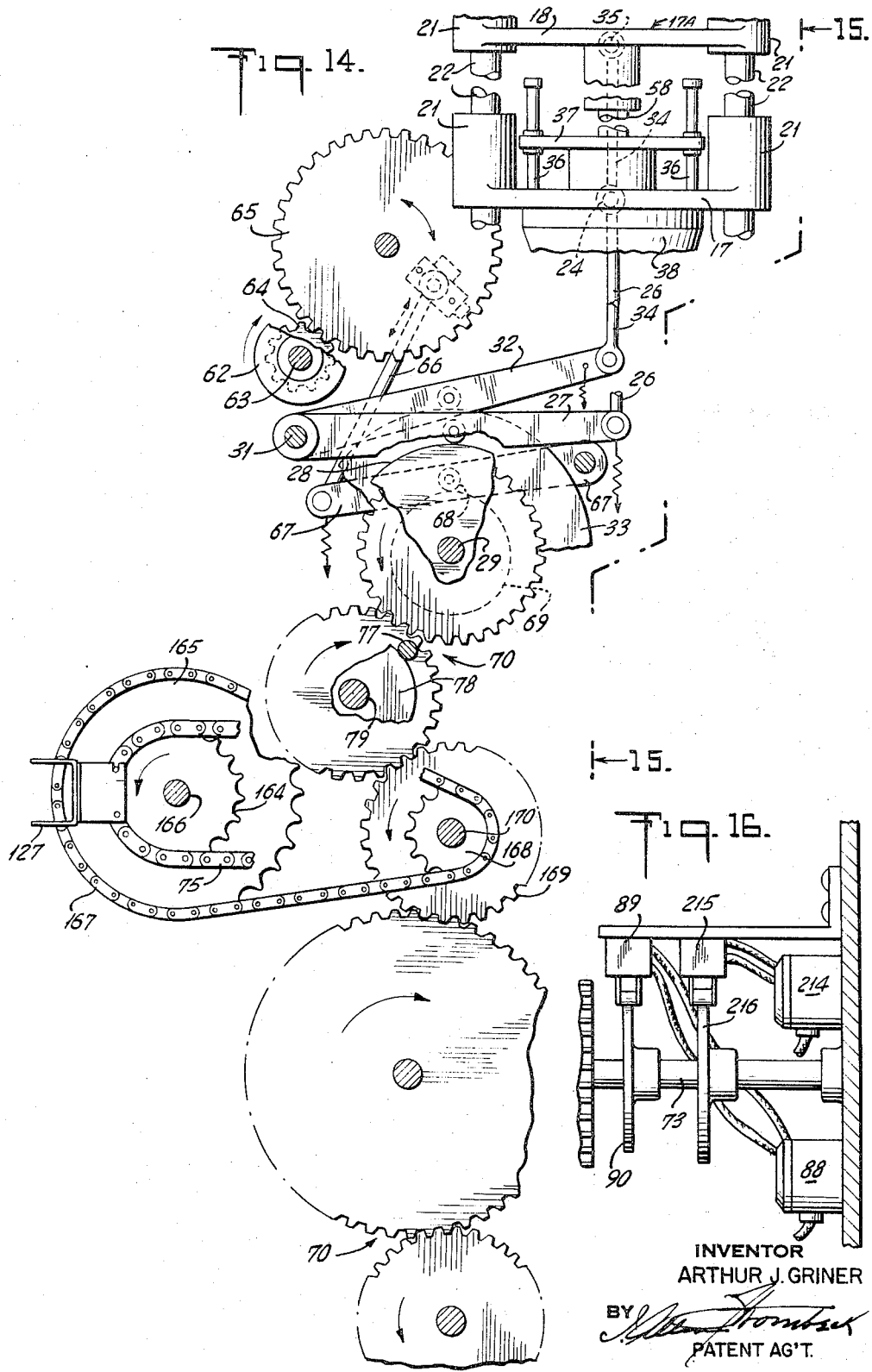

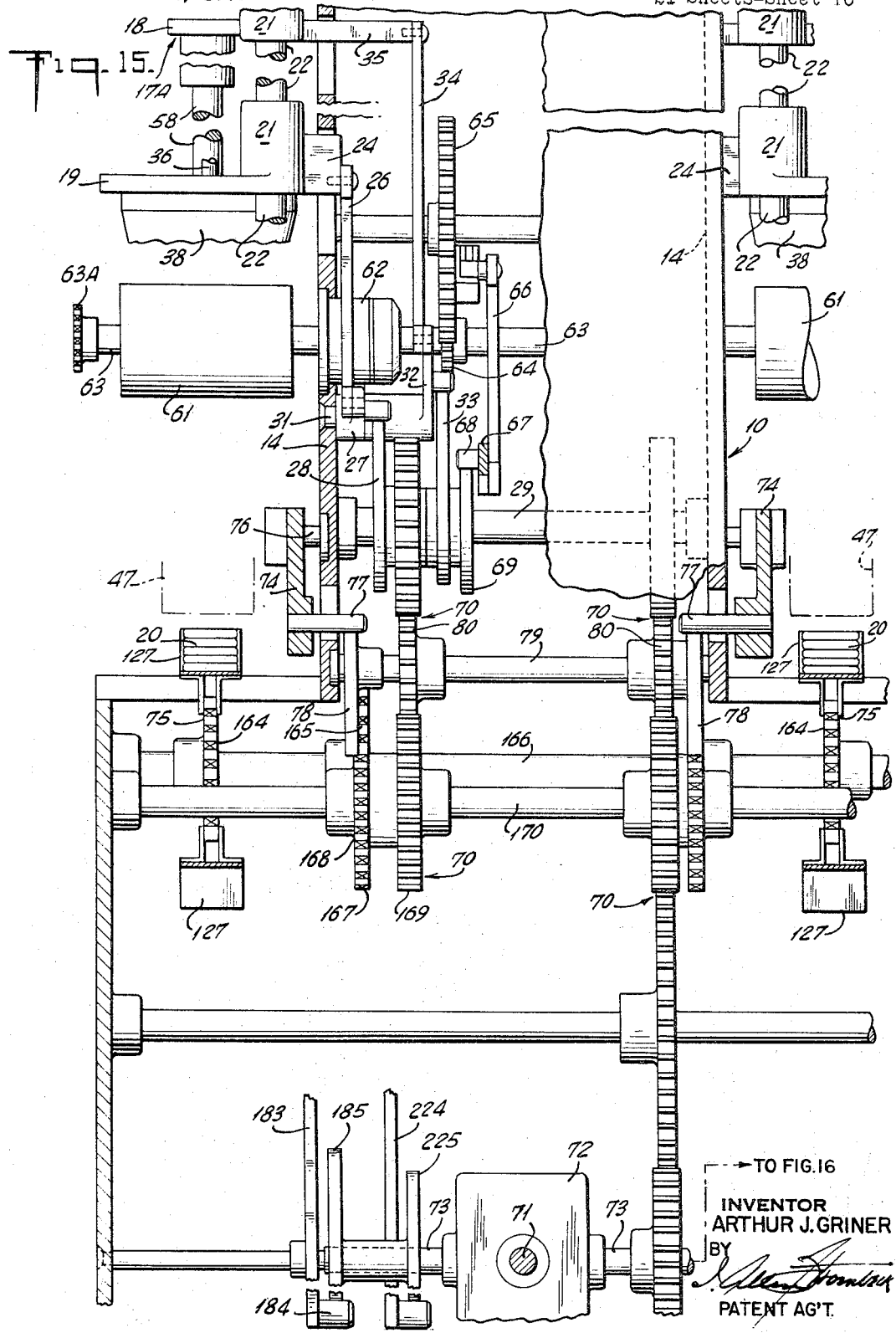

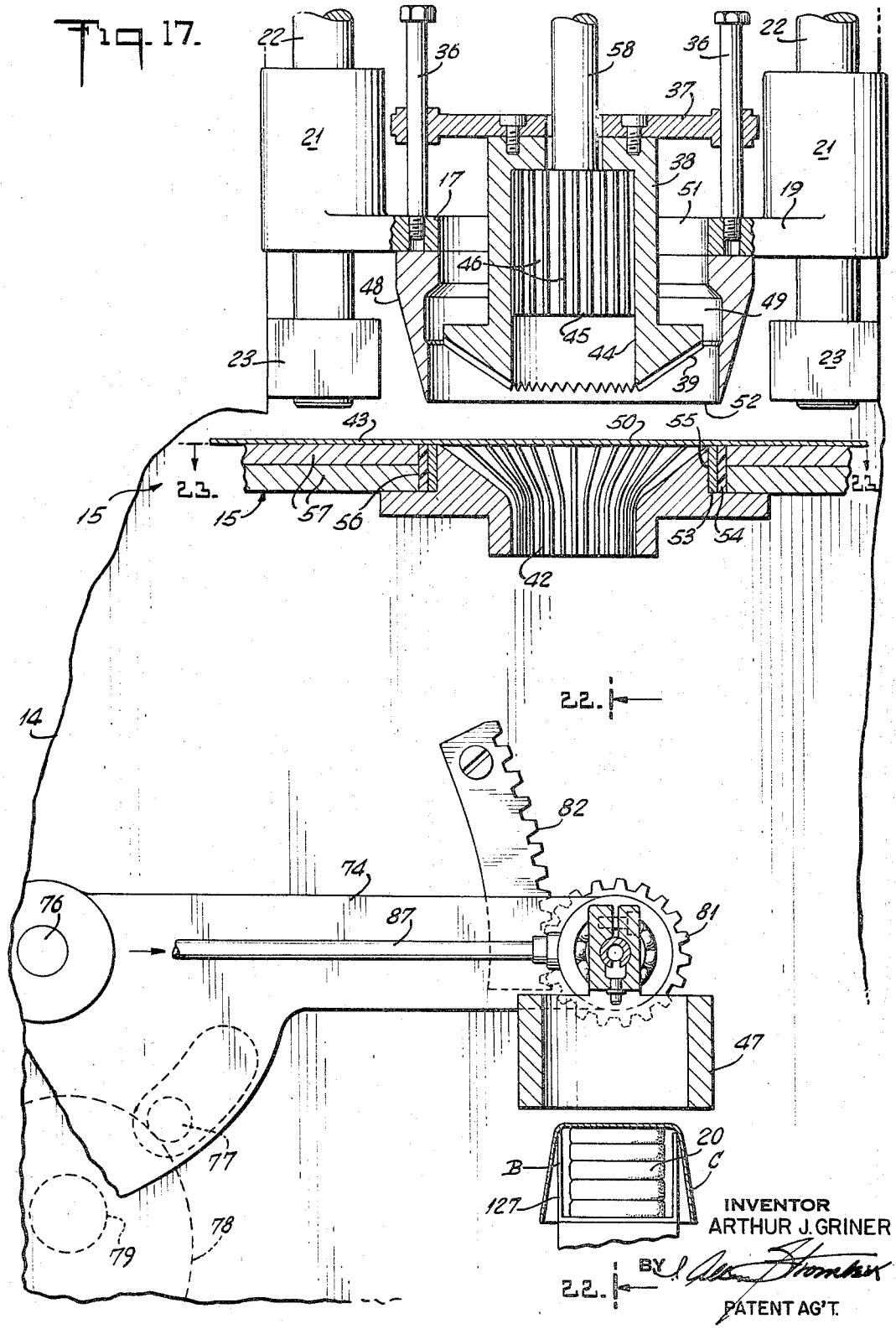

Oct. 3, 1967  A. J. GRINER  3,344,580
MACHINE FOR MAKING AND LOADING PAPER CUPS
Filed Oct. 15, 1965  21 Sheets-Sheet 13
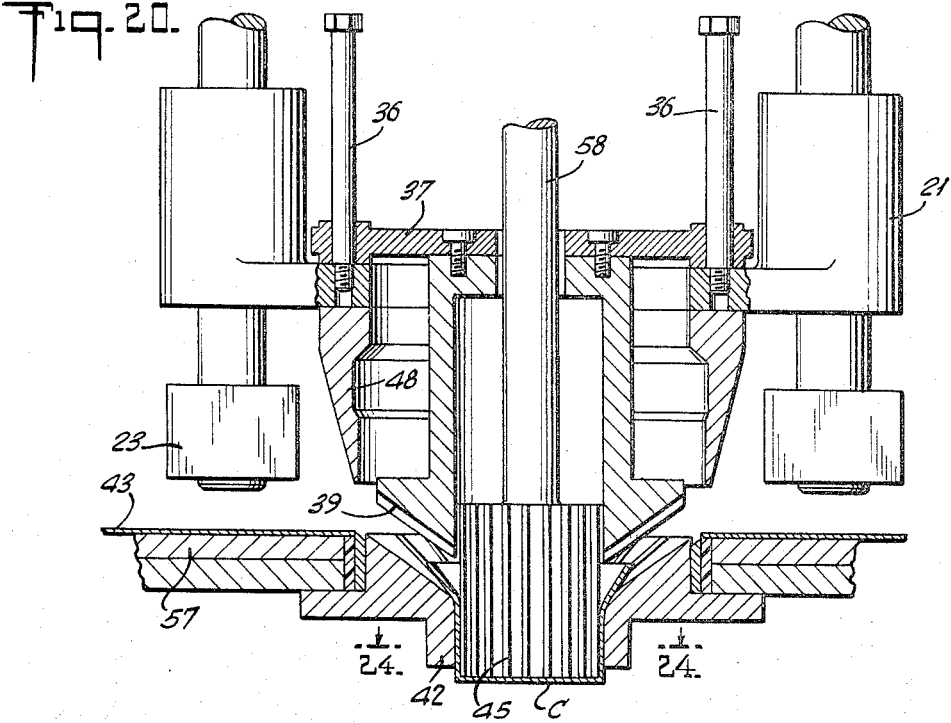
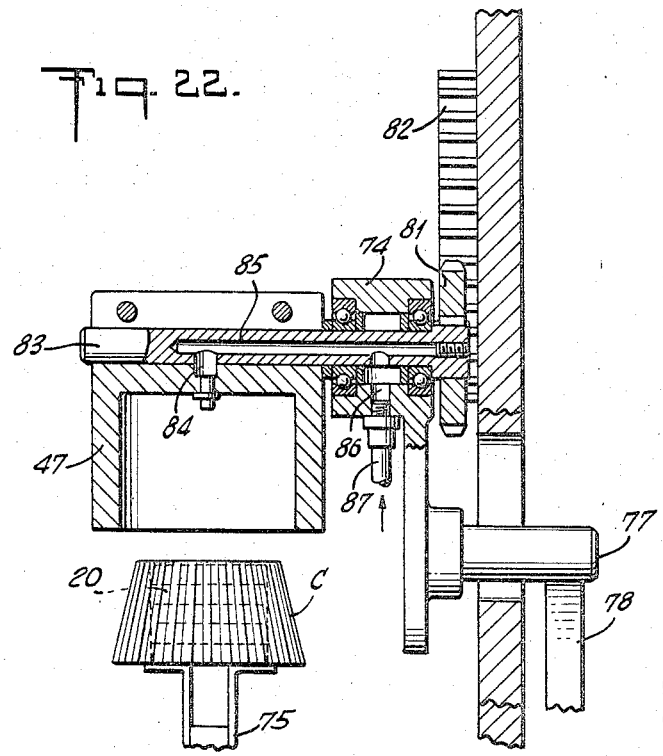
INVENTOR
ARTHUR J. GRINER
BY
PATENT AG'T.

Oct. 3, 1967     A. J. GRINER     3,344,580
MACHINE FOR MAKING AND LOADING PAPER CUPS
Filed Oct. 15, 1965     21 Sheets-Sheet 14

INVENTOR
ARTHUR J. GRINER
BY
PATENT AG'T.

Oct. 3, 1967 A. J. GRINER 3,344,580
MACHINE FOR MAKING AND LOADING PAPER CUPS
Filed Oct. 15, 1965 21 Sheets-Sheet 15

INVENTOR
ARTHUR J. GRINER
BY
PATENT AG'T.

Oct. 3, 1967   A. J. GRINER   3,344,580
MACHINE FOR MAKING AND LOADING PAPER CUPS
Filed Oct. 15, 1965   21 Sheets-Sheet 16
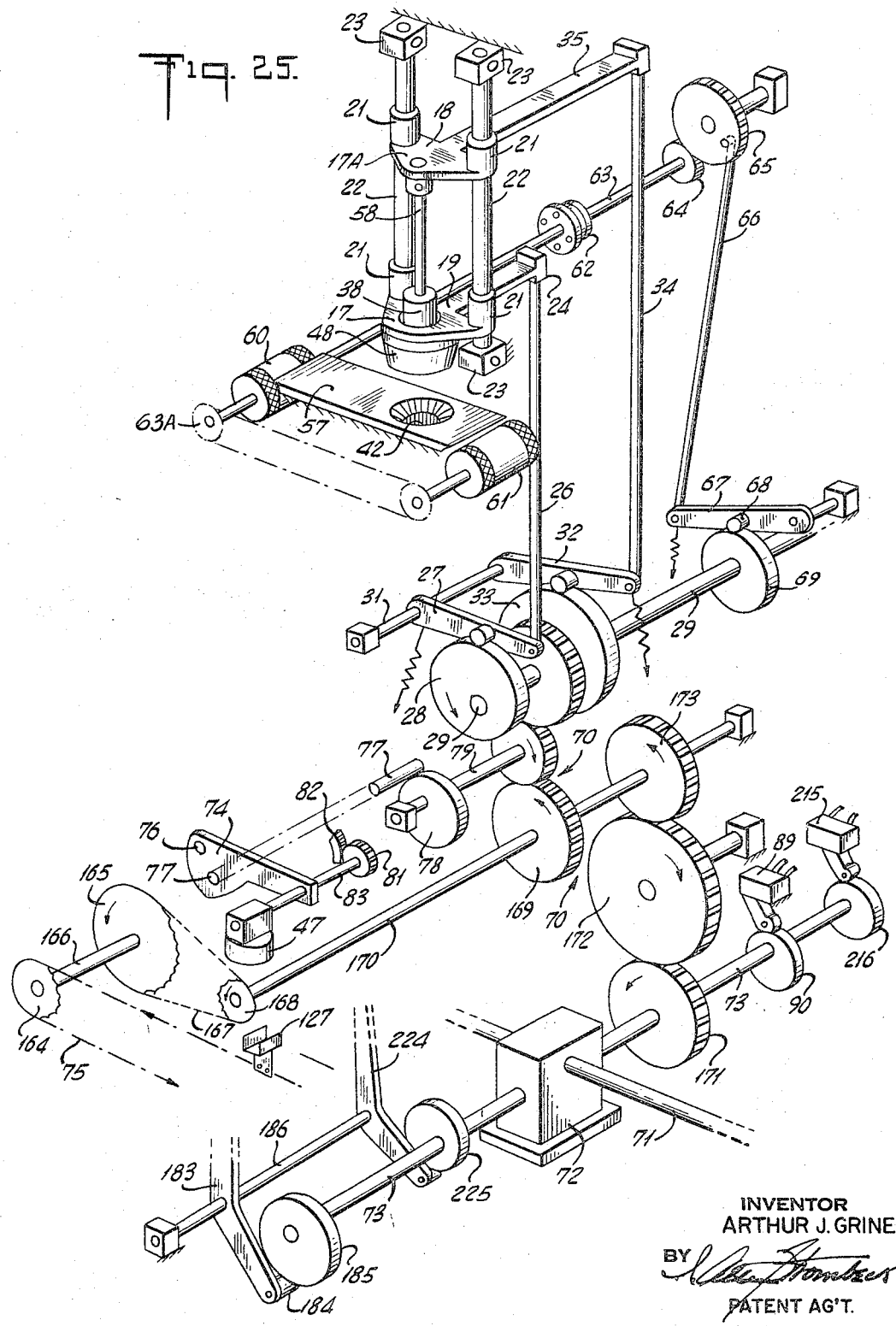
INVENTOR
ARTHUR J. GRINER
BY
PATENT AG'T.

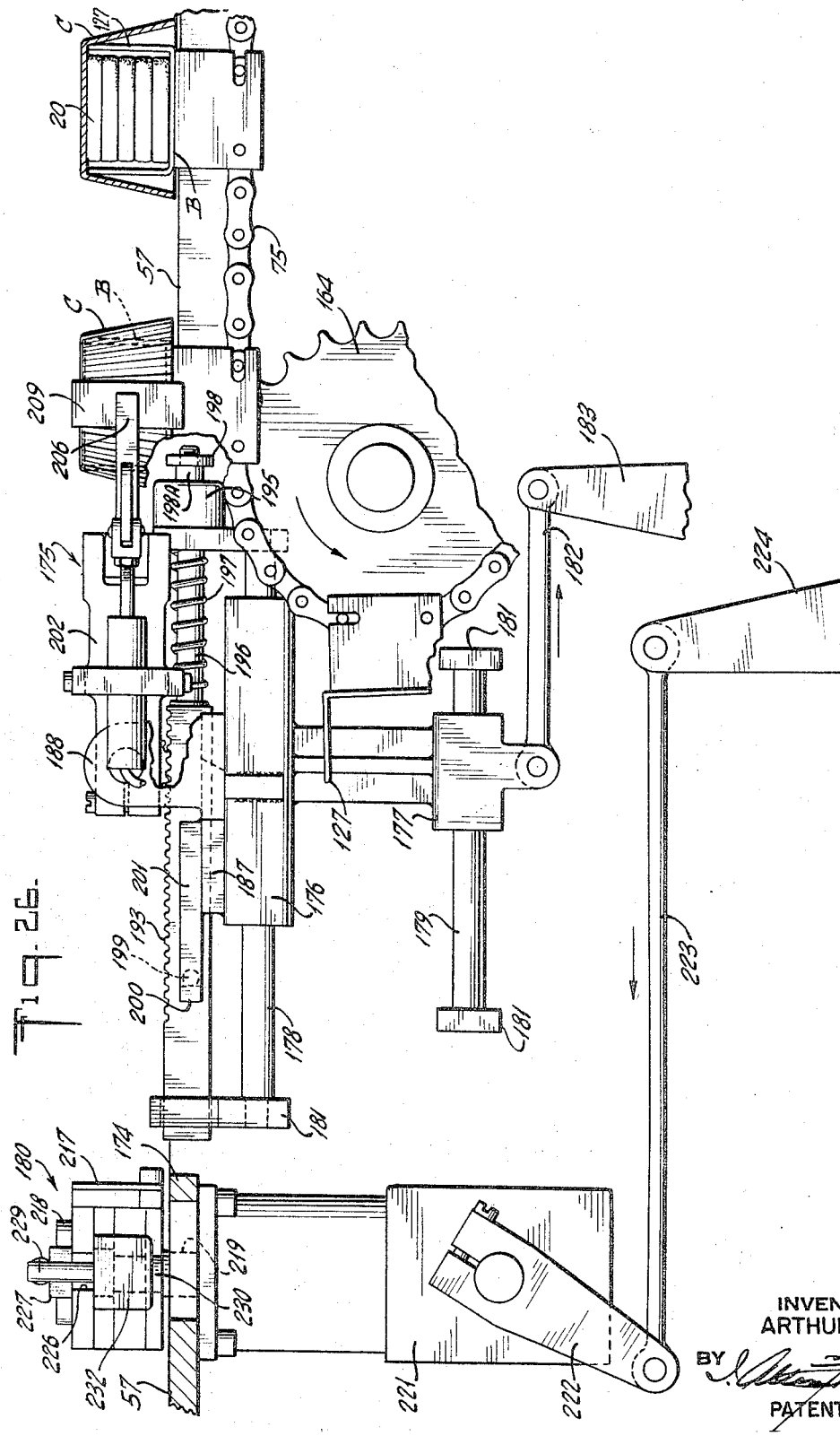

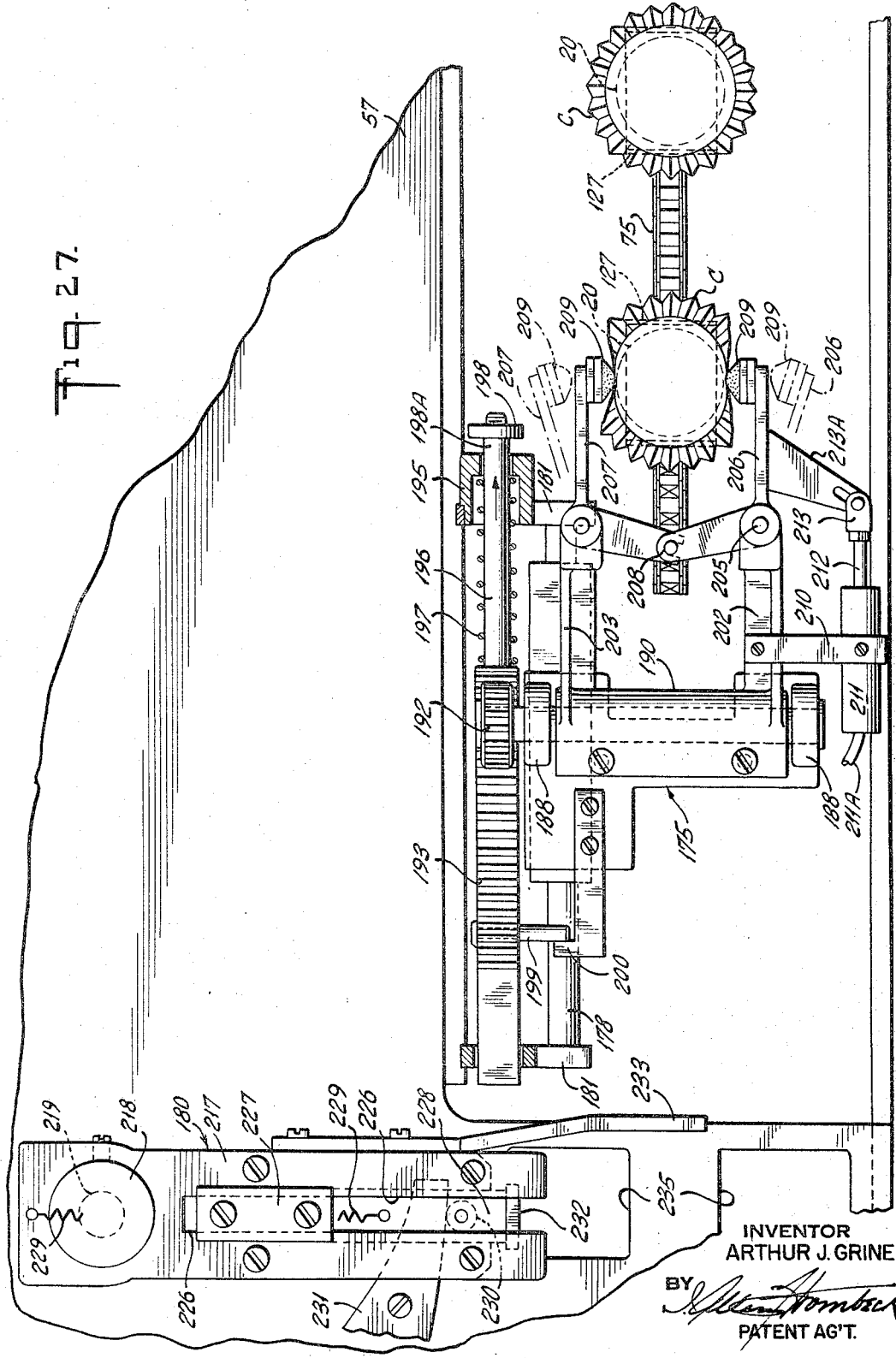

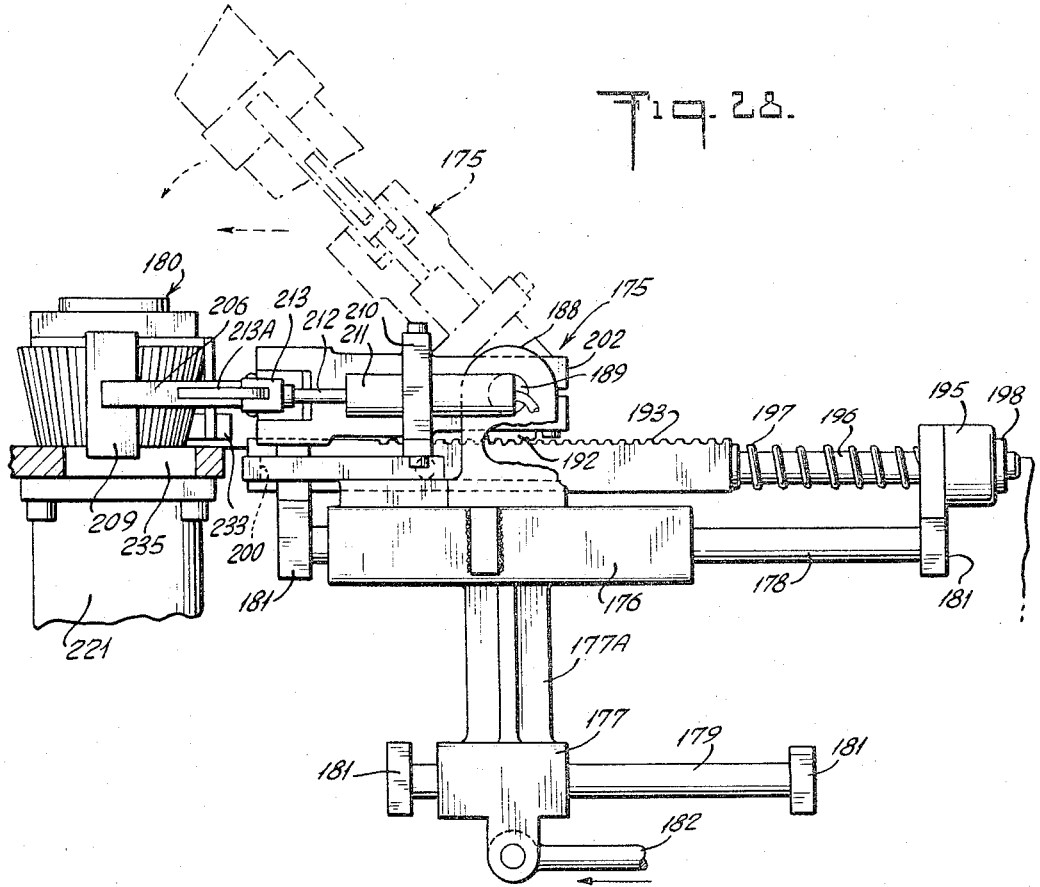
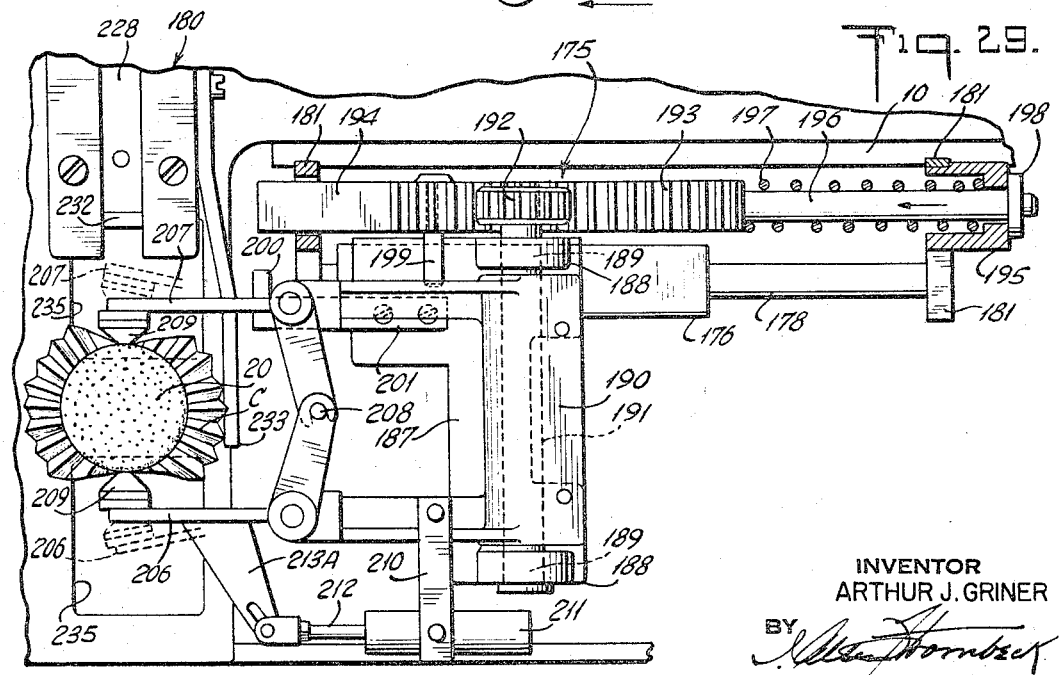

Oct. 3, 1967 A. J. GRINER 3,344,580
MACHINE FOR MAKING AND LOADING PAPER CUPS
Filed Oct. 15, 1965 21 Sheets-Sheet 20
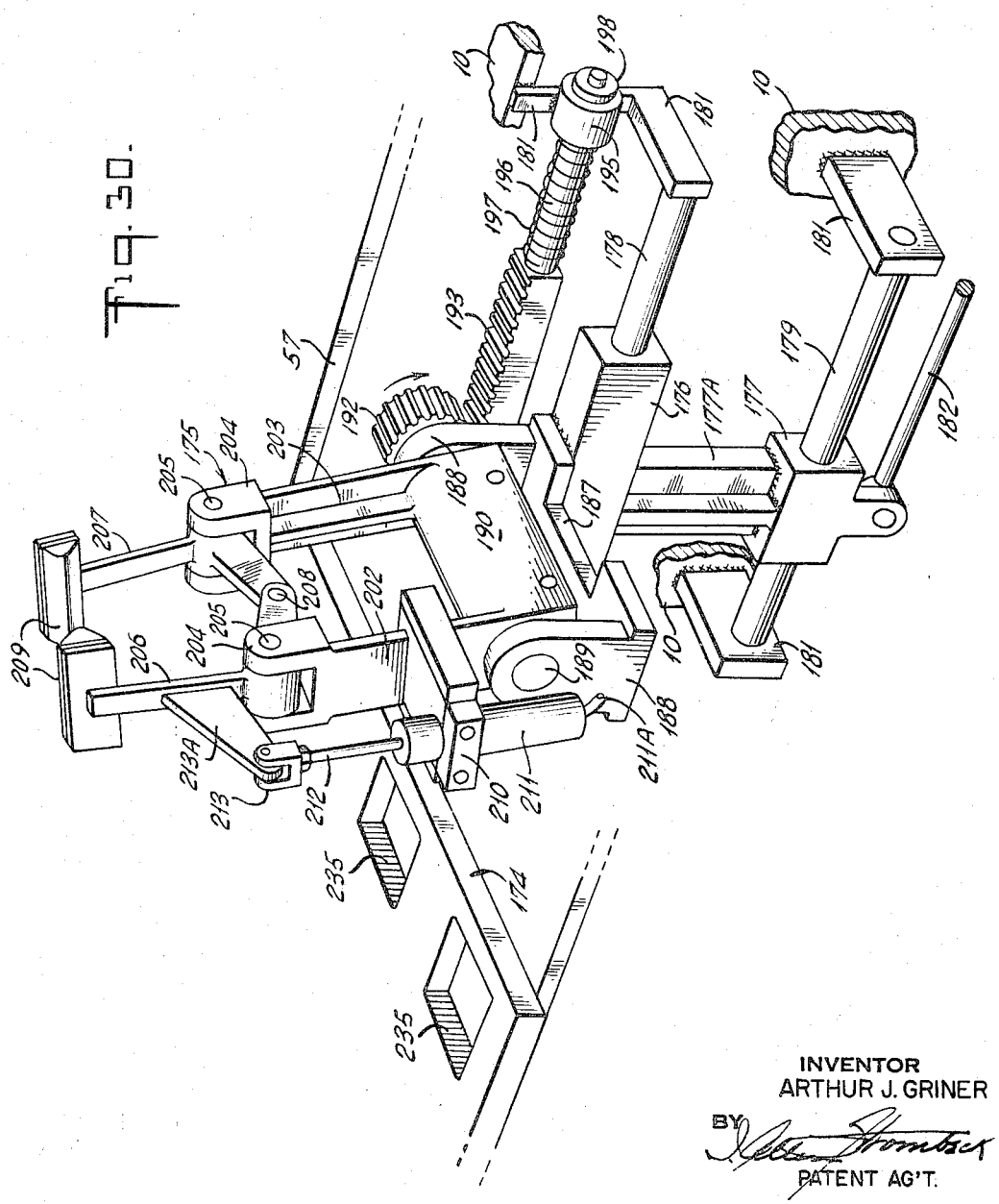
INVENTOR
ARTHUR J. GRINER
BY
PATENT AG'T.

Oct. 3, 1967　　　A. J. GRINER　　　3,344,580
MACHINE FOR MAKING AND LOADING PAPER CUPS
Filed Oct. 15, 1965　　　21 Sheets-Sheet 21
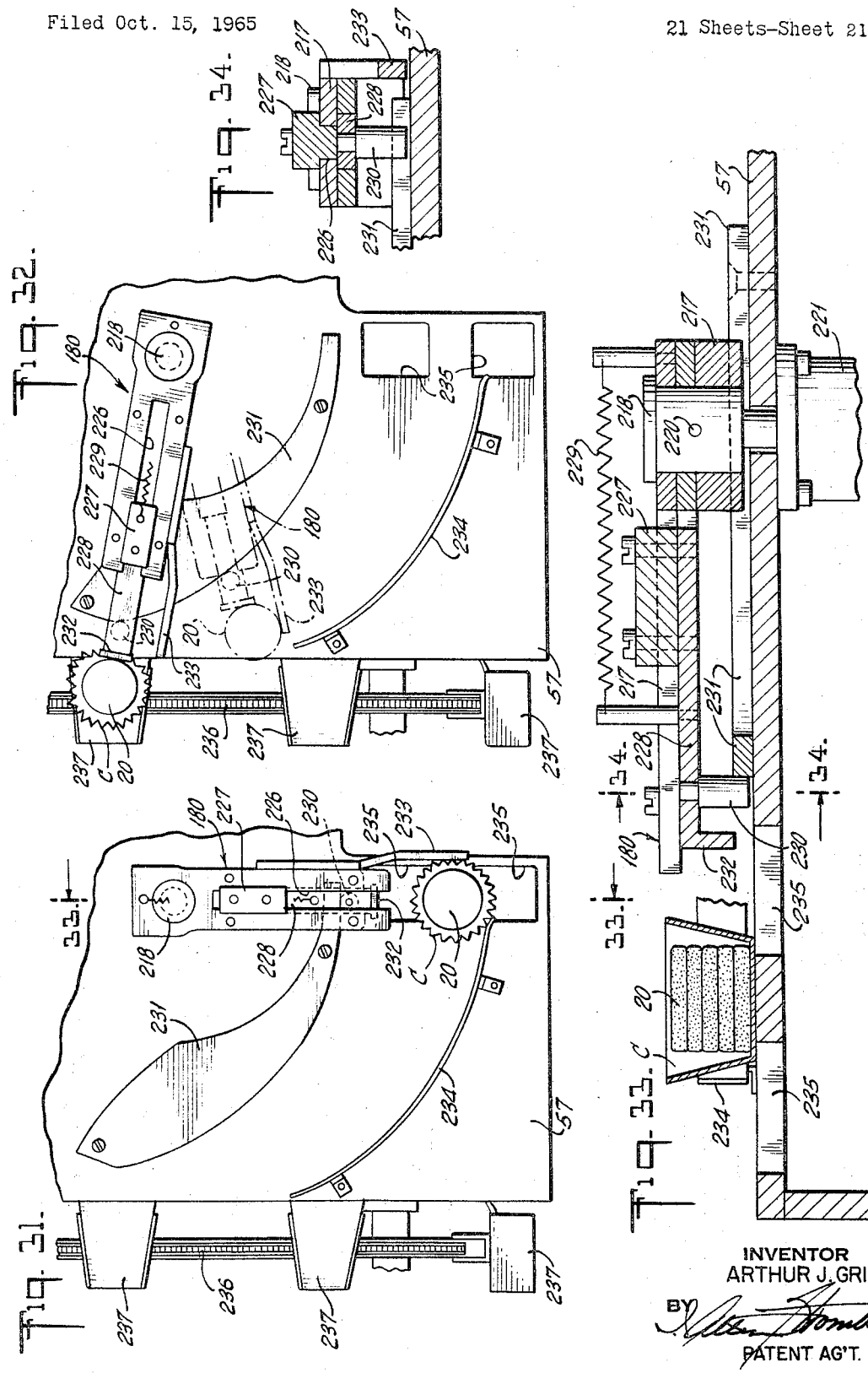
INVENTOR
ARTHUR J. GRINER
BY
PATENT AG'T.

United States Patent Office 3,344,580
Patented Oct. 3, 1967

3,344,580
MACHINE FOR MAKING AND LOADING
PAPER CUPS
Arthur J. Griner, Wyckoff, N.J., assignor to National
Biscuit Company, a corporation of New Jersey
Filed Oct. 15, 1965, Ser. No. 496,511
19 Claims. (Cl. 53—160)

This invention relates to improved means for producing fluted paper cups and filling the same with edible articles such as cookies or other confections and then discharging the filled cups ready for packing.

An important object of the invention is to reduce the time that has been heretofore consumed in the manual counting and cup filling operations in current practice so that the end product may be sold at smaller cost, and may be produced under the best sanitary conditions.

A further object of the invention is to provide means for accurately forming pleated paper cups from a web of glassine or other paper material which immediately upon completion can be filled with cookies without the necessity of handling the cups or dropping the cookies in order that breakage of the cookies may be completely eliminated.

A still further object of the invention is to produce automatic cookie accumulating means of novel structure which will eliminate the necessity for manual counting of the cookies that is currently necessary in filling the cups.

Another object of the invention is to provide novel means for transferring loaded cups from a filling area to an outfeed conveyor that will be rapid and efficient and will operate with a minimum amount of attention and cookie breakage.

Other objects of the invention include the provision of dual cup making means; the combination of selector conveyors working in conjunction with cross feed and accumulator conveyors to stack a predetermined number of cookies in the buckets of a conveyor; the use of means for capping the filled buckets of a conveyor with a pleated or fluted cup; the use of means for automatically righting the filled cups and transferring them to a discharge pusher; and the use of a novel discharge pusher which loads an outfeed conveyor with the loaded cups so that they can be advanced through the machine without manual handling and in a minimum of time.

With these and other objects in view, the invention comprises certain constructions hereinafter described and then particularly pointed out in the claims and a preferred embodiment of the invention is illustrated in the accompanying drawings, in which:

FIGURE 1 is a view in perspective showing the general arrangement and locations of the various operating stations of the machine;

FIGURE 1A is a diagrammatic view in elevation partly in section of the machine shown in FIGURE 1 illustrating the operating mechanisms for the various stations of the machine;

FIGURE 1B is a view in perspective of the fluted cup and its cookie contents;

FIGURE 2 is a plan view of the machine illustrated in FIGURE 1A showing the dual arrangement of the cookie handling means;

FIGURE 3 is a sectional view in elevation taken on the line 3—3 of FIGURE 2 and shows the cookie infeed operation;

FIGURE 4 is an enlarged plan view of the right hand portion of the machine of FIGURE 2, showing more detail of the cookie selector and feeding conveyor means;

FIGURE 5 is a view in sectional elevation on the line 5—5 of FIGURE 4 showing the relative arrangement of the twin selector conveyor means;

FIGURE 6 is a vertical section on the line 6—6 of FIGURE 4 showing the action of one of the selector conveyor means in association with a cross feed conveyor;

FIGURE 7 is a view in perspective of a cookie pusher used in connection with the selector conveyor shown in FIGURES 5 and 6;

FIGURE 8 is a diagrammatic view in perspective taken substantially along the line 8—8 of FIGURE 1A, showing the mounting and drive mechanism for one of the cross pusher means;

FIGURE 9 is a plan view of one of the pusher means shown in a first operating position ready to transfer cookies out of a cross feed conveyor into an accumulating conveyor;

FIGURE 10 is a view similar to FIGURE 9 showing the position of the pusher, after it has completed its cookie transferring stroke, from the position of FIGURE 9;

FIGURE 11 is a section in elevation taken on the line 11—11 of FIGURE 9 showing the relative positions of the pusher and the inclined cross feed conveyor from which cookies are transferred to the horizontal accumulating conveyor;

FIGURE 12 is a section on line 12—12 of FIGURE 10 illustrating the horizontal accumulating conveyor as it has fed thereto the cookies from the inclined cross feed conveyor;

FIGURE 13 is an enlarged section taken on the line 13—13 of FIGURE 12 showing the operation of one arm or finger of the pusher as it transfers a cookie from the inclined cross feed conveyor to the horizontal accumulating conveyor;

FIGURE 14 is a fragmentary view in front elevation of the machine section shown in FIGURE 1A, illustrating the various driving and cam mechanisms employed in controlling the operation of the parts;

FIGURE 15 is a vertical section taken substantially on the line 15—15 of FIGURE 14 showing the relative locations of the different mechanisms of the latter figure;

FIGURE 16 is a fragmentary detail of cam controlled air valve means associated with the cup handling means, and is an extension of the lower part of FIGURE 15 as indicated;

FIGURE 17 is a vertical section taken through the cup forming die and cup transfer means and constitutes the first step or start position of the cup handling parts;

FIGURES 18, 19 and 20 are views in section of the cup forming die as seen in FIGURE 17 showing the second, third, fourth and fifth steps of cup forming operation;

FIGURE 22 is a vertical section on the line 22—22 of FIGURE 17 showing the air control device employed in connection with the cup transfer means;

FIGURE 25 is a diagrammatic view in perspective showing the cup forming means and the various operating parts of the control mechanism;

FIGURE 26 is a side view in elevation of the cup reversing mechanism used in connection with an accumulating conveyor for feeding the filled conveyor buckets;

3,344,580

Figure 18:
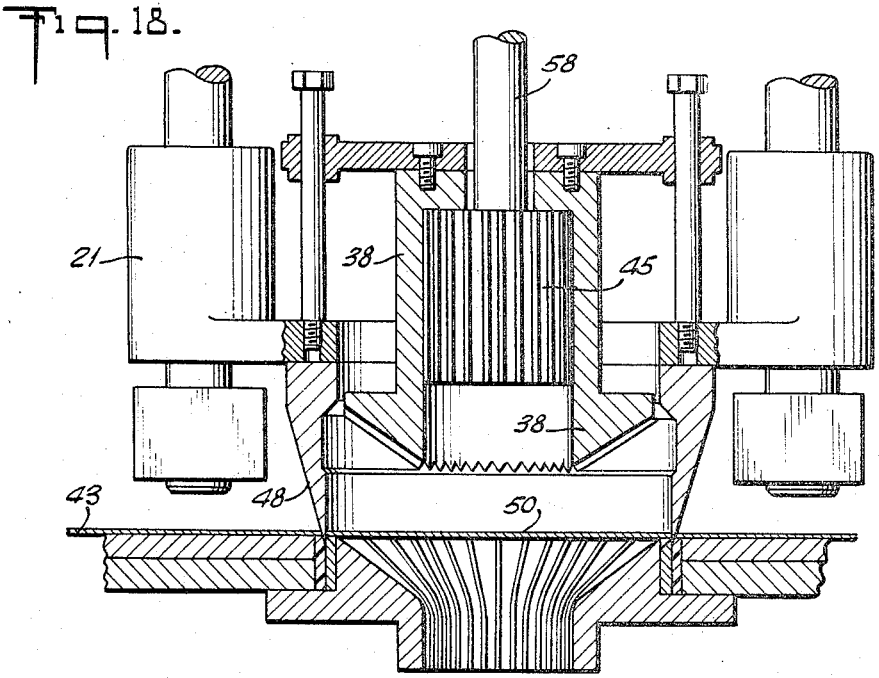

FIGURE 27 is a plan view of the cup reversing mechanism and pushing member illustrated in FIGURE 26;

FIGURE 28 is a view similar to FIGURE 26 showing the cup reversing mechanism at the end of an operating stroke, an intermediate position being shown in outline;

FIGURE 29 is a plan view of the cup reversing mechanism as it appears in FIGURE 28;

FIGURE 30 is a view in perspective of the cup reversing mechanism which transfers a loaded fluted cup to a position to be pushed into an outfeed conveyor;

FIGURE 31 is a plan view of the outfeed end of the machine showing the cupped cookies in position to be pushed into an outfeed conveyor;

FIGURE 32 is a view similar to FIGURE 31 showing the pusher in two positions of operation and a cupped package of cookies carried in one of the buckets of the outfeed conveyor;

FIGURE 33 is a vertical section on the line 33—33 of FIGURE 31, enlarged to show the relationship of the parts of the pusher; and FIGURE 34 is a vertical section on the line 34—34 of FIGURE 33 showing the interfitting relationship of the parts of the pusher.

Referring to the drawings in detail, 10 indicates the frame of the machine comprising top plates 11, FIGURES 1A and 2, supporting structural elements 12 therefor, the necessary cross members 13, side plates 14, and the like, to provide a solid frame for the machine, upon the top plate of which is mounted a superstructure 15 for the support of cup forming units 16. The machine is arranged with dual means, for feeding cookies or similar confections and depositing the same in paper cups at opposite sides of the center of the machine, and while the drive mechanism is operable to control the dual means, for the sake of brevity it will be sufficient to describe only one complete operating side of the machine. With this in view, each cup forming unit 16, (FIGURES 14, 15, 17 and 25) includes a lower cutter slide 17 and an upper forming slide 17A each consisting of lower and upper end plates 19 and 18, respectively shaped to provide sleeves 21 for sliding engagement with vertical rods 22 fixed at their ends in bearing brackets 23 secured to the wall of the superstructure 15.

As can be seen in FIGURES 14, 15 and 25 the lower slide 17 is provided with a boss 24 to which the upper end of an operating rod 26 is pivoted, the latter being also pivoted at its lower end to a cam arm 27 which is rocked by a cam 28 mounted on cam shaft 29. The arm 27 has a common pivot on stud 31 with a similar arm 32 which is actuated by cam 33 to raise and lower an operating rod 34 the upper end of which is pivoted to a suitable extension 35 on the slide 17A.

Figure 21:
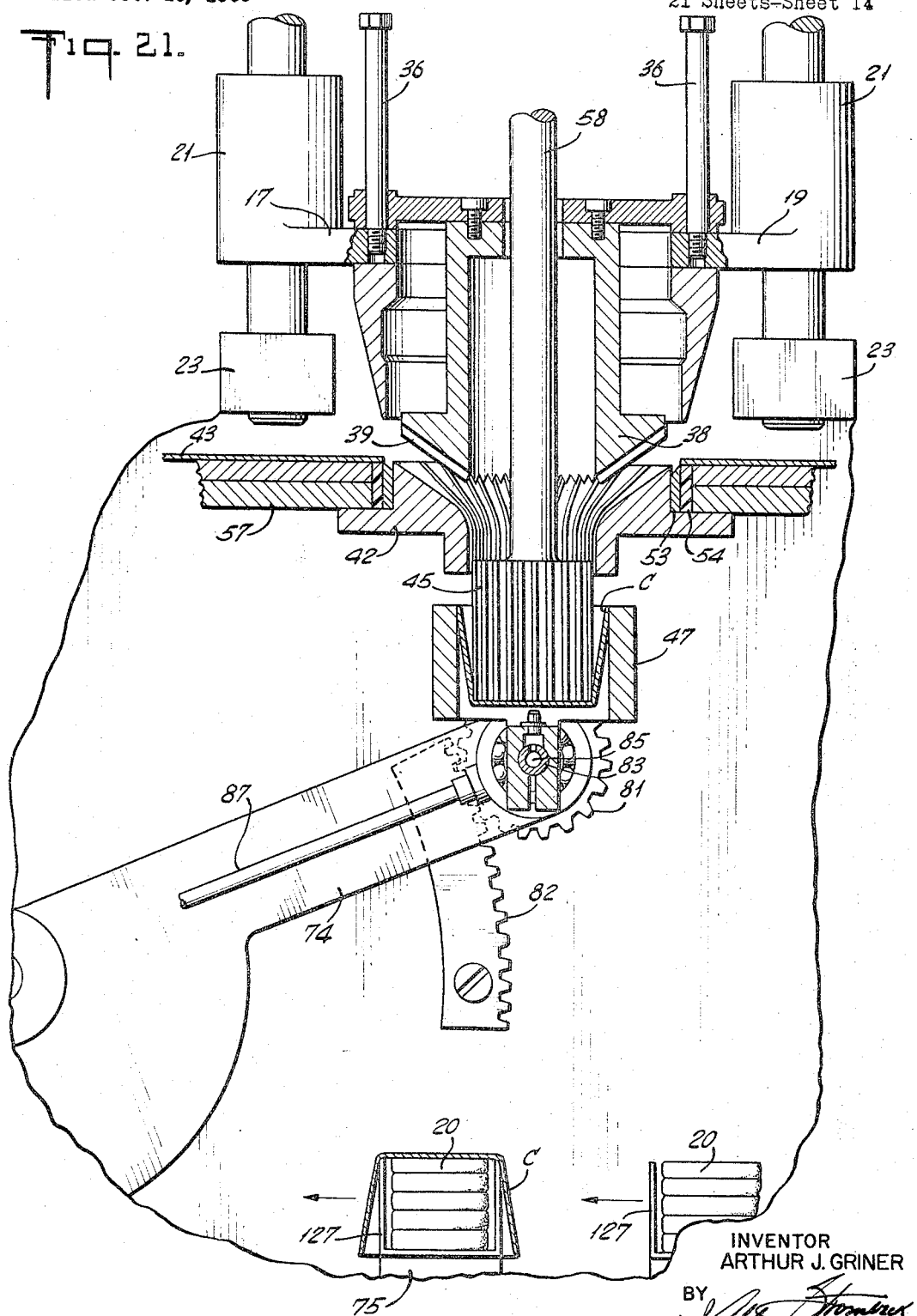
FIGURE 21 is a view similar to FIGURE 17 showing the cup transfer means at the beginning of its operation, which for convenience may be designated the sixth step, the relative positions of two of the accumulator conveyor buckets being also shown.
Figure 23:
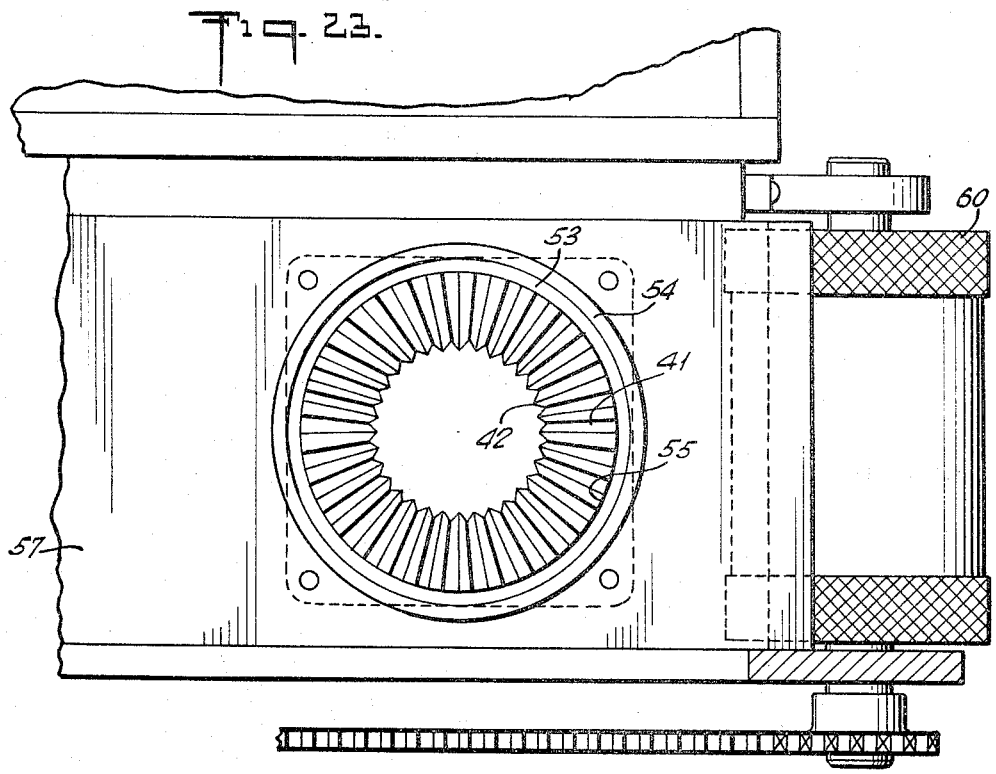
FIGURE 23 is a section taken on the line 23—23 of FIGURE 17 showing the shape of one of the interfitting parts of a die structure used in fluting the cookie carrying cups.
Figure 24:
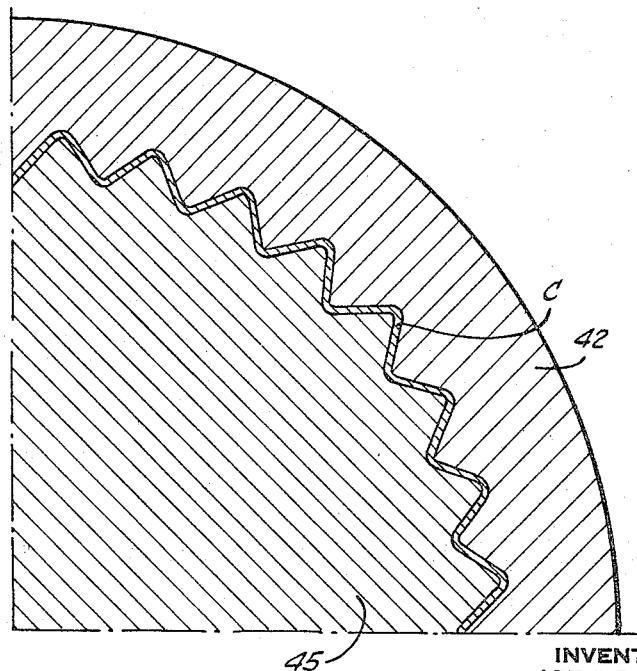
FIGURE 24 is an enlarged quarter section taken on the line 24—24 of FIGURE 20, showing the formation of the body of the cup used in packing the cookies.

Referring to FIGURE 17, the lower cutter slide 17 carries spaced upstanding studs 36 on which is slidably mounted a cross-piece 37 for the support of a fluting die member 38 the lowed fluted flared end 39 of which is adapted to engage the upper fluted flared wall 41 of a cup receptacle or die piece 42 after the web 43 of material is severed to provide the cup blank, to be later referred to. The die member 38, in a concentric bore 44 therein, carries a forming cylinder 45 the periphery of which is fluted as to 46 so that, as it passes down through the die piece 42, it will coact with the flutes 41 therein and crease the cup material as seen in FIGURE 21 to shape, extrude and flute the cup C in a single downward operation and force it into a cup transfer carrier 47 (FIGURE 21), the operation of which will be later referred to. The die parts 38, 42 and 45 may be heated by any suitable means.

Referring to FIGURES 17 through 21, it will be seen that in FIGURE 17 a cup C has been transferred from a suitable carrier 47 or transfer means, to cap the bucket B of a conveyor that has been filled with crackers 20 to the desired amount; in the present embodiment, five. The cutting and shaping of the cup C is accomplished by coordinated action of the cams 28 and 33 and the parts controlled thereby that raise and lower the upper forming slide 17A and the lower cutter slide 17. At this time, which marks the commencement of a cup forming action, the die member 38, the forming cylinder 45 and a cutter 48 are in their elevated or retracted position. The cutter is of ring shape, is secured to the under side of the lower end plate 19, which also constitutes the lower cutter slide 17, by any suitable means and provides an annular bore 49 large enough to accommodate the fluting die member 38 and coincide with an opening 51 in the plate 19. The cutter 48 is of substantially sleeve-like form and is shaped to provide at its lower end an annular cutting edge 52 which, when the die combination is lowered, coacts with gaskets or rings 53 and 54 of suitable material to cut a cup blank from the material of web 43. The rings 53 and 54 surround the flanged edge 55 of die piece 42 and position the same concentrically in a suitable opening 56 in the bed plates 57 that form a table in the superstructure 15 along which the web 43 of cup material is intermittently fed, as will be explained.

Figure 19:
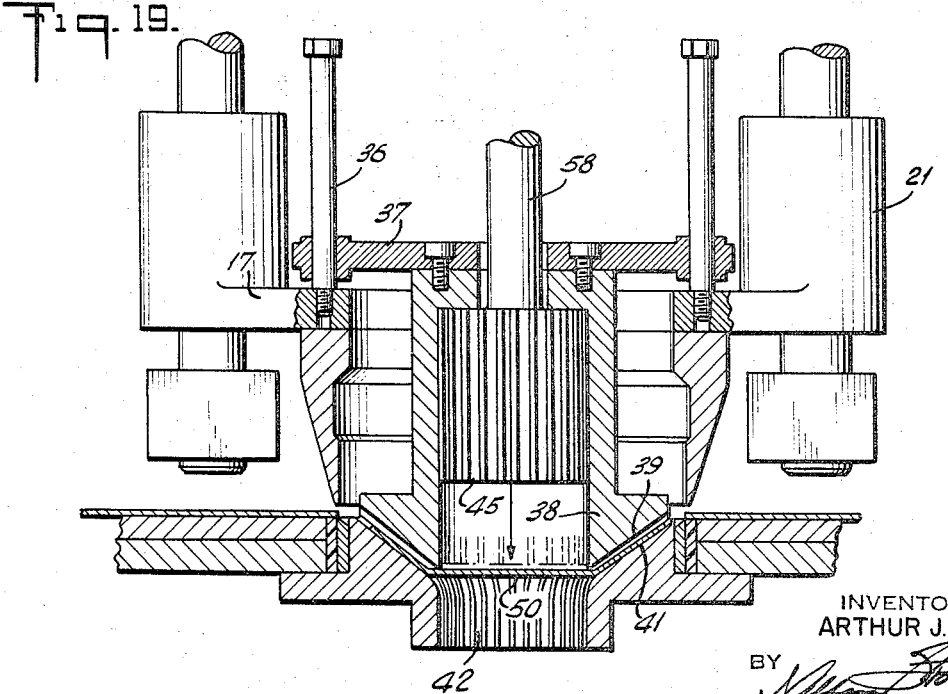

In FIGURE 18, the cutter 48 has lowered to position to cut from the web 43 a paper cup blank 50 which, as seen in FIGURE 19, is engaged by the fluting die member 38 and forced down into the flared portion 41 of the die piece or cup receptacle 42 to be fluted by the coacting flutes of the flared end 39 of the member 38 and the flutes 41 of member 42. This action of the die 38 occurs as the latter lowers by gravity when the forming cylinder 45 descends.

As the fluting die member 38 is slightly retracted by the action of cam 28 raising slide 17, the cam 33 gives a lowering movement to the upper slide 17A to which is attached the stem 58 of the forming cylinder 45 so that the latter lowers and forces the cup blank 50 down through the lower internally fluted interior of the die piece 42 to flute the wall of the cup from its bottom upwardly to its upper rim portion which tends to hold the cup C in place by friction, as shown in FIGURE 21, in a cup carrier 47. This figure shows the completion of one cycle of operation of cup forming and it will be noted that the cup C will be deposited over a second conveyor bucket to cap the same by the carrier 47.

The material of the cup may be of wax paper, plasticized material, glassine paper, metal foil or the like and is mounted on a roll 59 suitably pivoted on the superstructure and from which the web 43 is drawn intermittently by a feed roll 60 coacting with one end of the bed plate 57 to feed the web 43 to opposite feed roll 61, (FIGURES 1A, 14, 15 and 25) suitably knurled to provide a grip for the web. The feed rolls 60 and 61 are connected by a chain drive for driving operation of the latter. The web is fed intermittently by a one-way clutch 62 mounted on shaft 63, which carries one of the feed rolls 61, the shaft being driven through a pinion 64 by a rocker gear 65 driven in reversing arcuate motion by a connecting rod 66 from an arm 67 carrying a roller 68 for operation by a cam 69 on shaft 29. The latter is driven through a train of gears 70 from a main drive shaft 71 through a gear box 72, and a countershaft 73. The feed rolls are connected by a suitable sprocket chain driven from gear 63A on shaft 63.

As the cups are completed (FIGURES 15, 17, 21 and 25) they are deposited successively in the carrier 47 which swings between the outlet end of the die structure and the buckets B of an accumulating conveyor 75. The carrier comprises an arm 74 pivoted on a stud 76 fixed in a side plate 14 and carrying a cam roller 77 for contact with a cam 78 mounted on a counter cam shaft 79 driven from the gear train 70 through the pinion 80. On the free end of the arm 74 FIGURE 22, a pinion 81, for meshing engagement with a segmental rack 82 fixed to plate 14, is secured to a bored shaft 83 on which the outer or free end of the arm 74 is mounted in bearings so that free oscillatory motion of the shaft 83 is insured when the gear 81 moves back and forth across the rack 82 when propelled by the arm 74. The cup or carrier 47 is secured to the shaft 83. The arm 74 is actuated by the cam 78 as above explained, and synchronized with the feed of the accumulating conveyor 75 so that when the carrier 47 arrives directly above the bucket of the conveyor, it is in completely inverted position and receives a blast of air through a hole 84 in the bottom of the carrier to eject the cup C and deposit it upside down over the open upper end of a bucket of the accumulating conveyor 75 which holds five cookies. The hole 84 opens into an air duct or bore 85 in the shaft 83 in which an air inlet 86 in arm 74 carries the end of an air hose 87 the air supply of which passes through a valve 88 (FIGURE 16) which is controlled through operation of a micro-switch 89 actuated by a cam 90 on shaft 73.

The main drive shaft 71, driven by a motor 91 and sprocket chain 92, operates through a suitable gear box 93 (FIGURES 1A, 2, 3, 4, 5, 6, 7, and 14) to control the driving speed of a sprocket chain 94 and gear 94A, mounted on a stud shaft 95, and adapted to drive a gear 96 for transmitting drive through miter gear boxes 97 and 98 suitably coupled as at 99, and for driving a gear 100. The latter operates one end of a cracker infeed conveyor 101 having pushing fingers 102 passing about a drum 102A which remove cookies 20, one at a time from an infeed chute 103, and propels them to points within reach of the pushers of rectangularly shaped selecting conveyors 104 and 105 the chain conveyors 106 and 107 respectively, which are operated from miter gear box 98 through a suitable shaft 108, sprocket gears 109, cross shaft 110, chain 111 and the necessary gearing to drive the conveyor chain 107 all as clearly seen in FIGURE 3. A photocell control means is employed in connection with conveyor 103 to control the speed of a cross conveyor 125 that will be later referred to, in accordance with the feed of the cookies 20. The selecting conveyors 104 and 105 are rectangular in shape, are obliquely disposed with respect to the infeed conveyor 101, are parallel with each other, and are laterally spaced to register, at their discharge ends with cross feed conveyors 125 which parallel accumulating conveyors 75 which will be later explained. The selecting conveyors 104 and 105 are mounted on suitable support plates 114 secured to the conveyor platform or table section 115, which is slotted as at 116 to provide for travel of the infeed conveyor 101.

As the cookie propelled by each pusher 102 of the infeed conveyor 101 comes into the path of the selecting conveyors 104 and 105 (FIGURES 4, 5, 6 and 7) a pusher blade 117 secured to each selecting conveyor chain 106, 107 pushes the cookie 20 obliquely from the path of the infeed conveyor along the path 118 delineated by guide strips 119. The pusher blade 117 (FIGURE 7) is secured to a block 120 pivoted at one end on a sprocket chain link pin 121 and slotted as at 122 at the opposite end to receive, for sliding movement, the pin 123 of an adjacent link. The blade 117, at an angle to the direction of travel of the conveyor chains 106, 107, provides a sweeping motion that allows for the camming movement of a cracker out of the infeed conveyor, after it is engaged by the pusher blade 117. The crackers are discharged by the pusher blades 117 and drop off the table 114 at a cut-out portion therein to be received by the buckets of parallel conveying means 112, 113.

Each of the parallel conveying means 112–113 consists of two conveyors, one a short cross feed conveyor 125 carrying the open ended buckets 124 and being inclined upwardly, longitudinally with respect to the other conveyor, of substantial length designated here as an accumulating conveyor 75, and carrying open ended buckets 127 of substantially the same width as the buckets 124, FIGURES 9, 10 and 11.

The cross feed conveyor 125 is supported in its upper reach by a rail 126 which prevents sag of the chain to insure register of the buckets, FIGURES 8 and 11, has an intermittent movement, that is, it travels at the same speed as the constantly feeding accumulator conveyor 75, also supported by rail 126A, when the buckets 124 and 127 of each conveyor are in register, but is accelerated in its movement after retract of a pusher member, to be later referred to, in order to present a subsequent group of crackers for cross feeding.

Reference to FIGURE 2 will show that there are two laterally spaced sets of selecting conveyors 104, 105 and parallel conveyors 112, 113 and driving means for one set, shown in FIGURE 8, is duplicated in the other. The cross feed conveyor 125 of the parallel conveying means 113 is driven by the sprockets 128 and 129, the latter fixed to a stud shaft 130 carrying a chain gear 131 and operated by a sprocket chain 132 arranged in triangular form to pass over sprockets 133 and 134 spaced at opposite sides of a chain gear 135 mounted on cam shaft 136 which is driven from the miter gear box 137 through which passes the main drive shaft 71. Each of the sprocket gears 133 and 134 is carried on a stud 138 extending from the free ends of a cam lever 139 pivoted at its mid-point on a bracket 140, and having a cam roller 141 for engagement with a cam 142 fixed to shaft 136.

In the position of the parts shown in FIGURE 8, the cross feed conveyor 125 will be operating at the same speed as the accumulator conveyor 75 and the buckets of each will be in registry so that an operating cross pusher 143 can transfer cookies from one to the other. The speed of the conveyor 75 is constant and when cam 142 causes the cam lever 139 to incline in a counterclockwise direction, the speed of the conveyor 125 will be accelerated and when the cam lever is inclined clockwise the speed of the conveyor 125 will be decelerated.

Referring to FIGURES 4, 11, 12 and 13 the operation begins when the machine is first put into action by starting with one, two, three and four cookies respectively in the buckets A, B, C and D of accumulating conveyor 75 (FIGURE 12). Five individual cookies have been fed respectively to each of the buckets A, B, C, D and E of cross feed conveyor 125 and as these latter buckets come into registry with the buckets of conveyor 75, the pusher 143 will cross feed the single cookie out of the buckets of conveyor 125 and on top of the cookies in the buckets of conveyor 75 because the incline of the conveyor 125 compensates for the height of a stack of cookies in conveyor 75 with the result that bucket E of conveyor 75 will contain a stack of five cookies, bucket D, four cookies, etc. The timing provided by the operating cams and the speed control mechanism, indicated generally by numeral 144, permits continuous feeding of one cookie to each of five buckets, first to conveyors 125, (FIGURE 5) because the pushers 117 of the selecting conveyor 104 are grouped on the conveyor chain with a substantial space between the group. This is effective in order that first, five cookies will be fed to conveyor 125 and during the passage of regularly spaced buckets of conveyor 105 over the infeed conveyors, five remaining cookies will pass to the other cross feed conveyor 125. At no time are cookies fed to the accumulating conveyors 75 except by the cross feed pusher 143 and each cycle of feed of cross feed conveyor 125 is equivalent to one increment of each bucket of accumulating conveyor 75, so that when the buckets A–E of conveyor 75 advance, they each receive one cookie and as each bucket travels one increment a full bucket 145 (as seen in FIGURE 12) is effected. The conveyor 125 is retarded by the speed control mechanism so that it is operating at the same speed as the conveyor 126 while the cross pusher 143 has forward and retract strokes, also a longitudinal movement to transfer a cookie from the buckets A to E of conveyor 125 into buckets A to E of conveyor 75, and return to a position alongside conveyor 125 ready for the next cookie feeding stroke.

While two cross pushers 143 are used, the structure and operation of one only will be described. The side plates 14 support spaced cross bars 145, FIGURE 8, upon which is mounted for free sliding movement a slide block 146 having a central boss 147 through which are arranged for sliding movement a pair of pins 148 to which are secured the foot portions 149 of an inverted U-shaped frame 150, shaped to provide a top plate 151 having depending pusher tabs 152 for pushing the cookies out of one bucket into another as above described. The cross pusher 143 is given a longitudinal movement to coincide with the movement of the conveyors 125, 75 while it is being projected laterally in a cookie transferring movement. This longitudinal movement is caused by a tie rod 153 secured to one foot 149 of the frame 150 and to the free end of a cam operated bell crank 154 pivoted to a suitable bracket 155 for operation through a roller 156 by a cam 157 on shaft 136.

The cookie transfer action of the cross pusher 143 is provided by a tie rod 158 secured to the slide block 146 and operated by an oscillatory arm 159 controlled through a miter gear box 160, the gears of which are actuated by a rocker shaft 161 whose cam arm 162 engages a cam 163 on cam shaft 136, the shaft 136 and shaft 161 being suitably journalled in the side walls of the machine frame. The conveyor 75 is driven from a chain sprocket 164, FIGURE 25, which is driven by a chain gear 165 mounted on the shaft 166, FIGURE 14, the gear 165 being in turn driven through a chain 167 from the chain pinion 168 of a gear 169 which is included in the train of gears 70 and is mounted on shaft 170. The drive of the latter is from shaft 73 through the gears 171, 172 and 173 of the gear train 70.

After the buckets 127 of the conveyor 75 are capped by the inverted cups C (FIGURES 26 to 30) they move to the end of the conveyor 75 where a cup C is in inverted position and its contents of five cookies 20 is engaged by a cup rightly and transfer means 175 located in an opening 174 in the top of the bed plate 57 and comprising upper and lower slide blocks 176 and 177 respectively, connected by a vertical post 177A for sliding movement on upper and lower slide bars 178 and 179, respectively. The block and post structure along with the parts mounted on block 177 constitutes a slide structure or means operating to transfer the filled cups, while being righted, to a pusher member 180 which discharges the cups into an outfeed conveyor, to be later referred to.

The bars 178 and 179 are suitably secured in brackets 181 mounted on any convenient part of the frame 10 of the machine. The slide structure is reciprocated on the bars 178 and 179 by a connecting rod 182 having one end secured to block 177 and the other end secured to the upper end of a bell crank 183, FIGURES 1A, 14, 15, 16 and 25, whose roller 184 is actuated by a cam 185 on shaft 73. The bell crank is pivoted on a suitable stud 186. The block 176 mounts a saddle 187 the ends of which are shaped to provide ears 188 in which the trunnions 189 of an oscillatable gripper support 190 are rotatably mounted. The trunnions are the end portions of a shaft 191 to which the gripper support 190 is keyed, one end of the shaft extending beyond one ear 188 to carry a pinion 192 for meshing engagement with a rack 193, FIGURES 29 and 30, which is mounted for longitudinal sliding movement in a bracket 181 at a squared non-toothed end 194 and in a spring bearing cup 195 at a stemmed end 196. The latter carries a spring 197 that yieldably maintains the rack in a position with its stop nut 198 in contact with the outer surface of the cup 195 and a gauge pin 199, projecting from the side of the rack, in a definite position for coacting relation with the stop end 200 of a stop bar 201 secured to the saddle 187.

When the slide structure is reciprocated by the connecting rod 182, under influence of the associated cam, the pinion operating along the rack will swing the gripper support 190 arcuately. The latter also is shaped to provide arms 202 and 203 having the ends of saddle or clevis shape 204 in each of which is trunnioned as at 205 bell crank gripping arms 206 and 207 pivotally joined midway between the arms as at 208 and carrying at their outer free ends elongated rubber pads 209 which may also be of any suitable soft friction material for gripping the inverted capped cookies and cup C through the open sides of the buckets 127 of conveyor 75 without damage, as shown in FIGURE 26. The arm 202 has secured thereto a bracket 210 for holding an air cylinder 211 whose piston actuated rod 212 extends out of the cylinder at one end and carries a clevis 213 in which is pivoted an extension 213A of the arm 206.

It is evident that advance and retract operation of the piston rod under air operation of a piston, not shown, through air hose 211A, is controlled through an air valve 214, FIGURE 16, which is controlled from a microswitch 215 operated by a cam 216 on shaft 73 and that the extent of swinging movement of the gripper and synchronous operation thereof is controlled by operation of the connecting rod 182 from cam 185.

In FIGURE 27, when the gripper pads 209 engage the cup and cookies as a unit, it will be remembered that the conveyor 126 is moving to the left and in order not to damage the cup and cookie package, the cup righting and transfer gripper means is synchronized for movement to the left by the action of the cam 185. Movement to the left would normally roll the pinion 192 to rotate the gripper means but this swinging movement is delayed momentarily by the fact that when the gripper is at the start of its operation as in FIGURES 26 and 27, the gauge pin 199 on the rack has been pushed by the stop 200 so that a small space 198A separates the nut 198 and the cup 195. The moment the gripper arms close on the cup the cam starts a leftward movement of the rod 182 so that the gripper will move along at the same speed as the conveyor. During this interval the pinion and rack operate as a unit, and there is no swinging movement of the gripper until the stop 200 moves far enough from the pin 199, to close the gap 198A, under spring pressure, to permit the pinion to operate and swing the gripper.

Referring to FIGURES 26 to 33 the means for transferring the cookie packages, that have been taken from the conveyor 75 and righted in position during operation of the cup righting and transfer means 175, is shown in conjunction with the latter. In FIGURES 27, 30 and 34, the pusher member 180 consists of a channel shaped arm 217 supported on a sleeve 218 fixed to a shaft 219 as at 220, the shaft extending through an opening in the bed plate 57 from a miter gear box 221 secured to the underside of the plate 57. The gears of the box are actuated intermittently through an arm 222 (FIGURES 1A, 25 and 26) and a connecting rod 223 operated from the upper free end of a spring biased bell crank 224 actuated by a cam 225 on shaft 73. The intermittent motion provided by the cam operates the pusher in periodic movement to transfer the cookie packages to an outfeed conveyor in synchronism with the action of the transfer means 175. The pusher 180 further includes a slot 226 in plate 217 through which a block 227 slides, the block supporting a pusher plunger 228 which is biased by a spring 229 to maintain a roller 230 on 228 in contact with the face of an arcuate shaped plate cam 231 secured to the bed plate 57. Th cookie pack engaging end of plunger 228 has a pad 232.

The pusher 180 carries a forwardly projecting combination guide and pusher bar 233, which, with the end of an arcuate guide strip 234, FIGURE 31, forms a corner pocket into which the gripper, when it opens as seen in FIGURE 29, deposits the cookie package on a section of the bed plate between two spaced openings 235 that allow the gripper arms 206 and 207 to overreach the pusher bar 233 and descend sufficiently to deposit the cookie package without jarring the same. In FIGURES 31 and 32 the progressive operations of a discharge pusher member 180 are shown. When the cookie package, that is the cup with its five cookie contents, has been deposited on the bed plate 57, which at this end of the machine may be called the discharge table, the discharge pusher member 180 begins its clockwise sweep and the pusher bar and guide 233 propels the package along the chute formed by the guide strip 234 until the cam roller 230 extends the pusher arm 228 to engage the package as it nears the end of its sweep and in synchronism with the travel of the outfeed conveyor 236 whose buckets 237, having diverging side walls, act as pockets into which the packages are forced by the final action of the pusher arm 228. It will be evident that the sweeping action of the pusher bar and guide 233 will travel the package unit at the same speed as the conveyor preparatory to the discharge thereinto the unit by the plunger 228.

The invention is not to be restricted to the precise details of construction shown since various changes and modifications may be made therein without departing from the scope of the invention or sacrificing the advantages to be derived from its use.

What is claimed is:

1. A machine for making and loading paper cups with cookies or the like including cookie infeed conveyor means in which cookies are fed in seriatim, a selector conveyor transversely disposed with relation to said infeed conveyor means, a pair of parallel conveyors including an accumulating conveyor and a cross feed conveyor leading from the selector conveyor and to which cross feed conveyor is supplied a predetermined number of cookies by said selector conveyor, cookie pusher means for moving said predetermined number of cookies out of the cross feed conveyor into the accumulating conveyor, cup forming means beneath which said accumulating conveyor passes, pivoted cup carrier means between the cup forming means and the accumulating conveyor for receiving from said forming means a finished paper cup right side up and depositing the same in inverted capping position over a bucket of the accumulating conveyor to enclose the cookies therein, cup righting and transfer means for picking the inverted cup and cookies as a unit out of the accumulating conveyor bucket, and a discharge package pushing means within operating range of which is deposited, right side up by said transfer means, said cup and cookie unit for discharge.

2. A machine for making and loading cups with cookies or the like comprising a cookie infeed conveyor in which cookies are fed in seriatim, selector conveyors arranged in spaced obliquely disposed relation to said infeed conveyors, a pair of parallel bucket conveyors leading from each selector conveyor, one of each pair of parallel conveyors constituting a cross feed conveyor and the other of each pair of parallel conveyors constituting an accumulating conveyor, said selector conveyors each feeding a predetermined number of cookies to each cross feed conveyor alternately, cookie pusher means for moving the cookies out of the buckets of the cross feed conveyors into the buckets of the respective accumulating conveyors, cup forming means beneath which each accumulating conveyor passes, a pivoted cup carrier means between each cup forming means and each accumulating conveyor for receiving from each forming means a finished cup right side up and depositing the same in inverted capping position over a bucket of the respective accumulating conveyor to enclose the cookies therein, cup righting and transfer means at the terminal end of each accumulating conveyor for picking the inverted cup and cookies therein as a unit out of the accumulating conveyor bucket, and package pushing means associated with each righting and transfer means and within operating range of which is deposited, right side up by said transfer means, said cup and cookie unit for discharge.

3. A machine for making and loading paper cups as defined in claim 1 wherein the selector conveyor includes a chain drive, pusher blades on the chain drive for feeding cookies from the infeed conveying means during passage of a portion of said chain means across the infeed conveyor means whereby a predetermined number of cookies will be fed as a group serially to the cross feed conveyor.

4. A machine for making and loading paper cups as defined in claim 2 wherein the selector conveyors each include rectangular chain means, pusher blades on each chain means for feeding cookies from the infeed conveyor means at spaced points therealong during passage of a portion of each chain means across the infeed conveyor means whereby pretermined numbers of cookies, as a group, will be fed serially to each of said selector conveyors.

5. A machine for making and loading paper cups as defined in claim 1 wherein said accumulating conveyor and cross feed conveyor each have buckets for lateral registration when the conveyors are travelling at the same speed and means for accelerating and decelerating the movement of said cross feed conveyor with respect to the movement of said accumulating conveyor.

6. A machine for making and loading paper cups as defined in claim 1 wherein said accumulating conveyor and said cross feed conveyor each have open sided buckets for lateral registration when the conveyors are travelling at the same speed for cookie transfer by said pusher means, and the cross feed conveyor being inclined upwardly so that the bottom of each bucket thereof varies in height above the bottom of each bucket of the accumulating conveyor whereby cookies can be accumulated successively in the buckets of said accumulating conveyor when pushed from said cross feed conveyor.

7. Conveying means including parallel bucket conveyors, the buckets of which are in lateral register during travel, one conveying means being arranged horizontally and the other conveying means being inclined with respect thereto whereby the bottoms of the buckets of the inclined conveyor are successively higher in longitudinal travel than the bottoms of the buckets of the horizontal conveyor to constitute stacking means in the horizontal conveyor when cookies or the like are transferred from the inclined conveyor.

8. A machine for making and loading paper cups as defined in claim 1 in which said accumulating and cross feed conveyors include open ended buckets in register laterally during longitudinal travel of the conveyors means for rigidly supporting each conveyor, a frame, means for moving said frame laterally across the cross feed conveyor to push crackers out of the buckets of the cross feed conveyor and into the buckets of the accumulating conveyor and means for moving said frame longitudinally parallel to the conveyors to compensate for the longitudinal movement of the latter while the cookies are being moved from one conveyor to the other.

9. A machine of the character set forth in claim 1, wherein said cup forming means includes upper and lower slide means, the lower slide means supporting an annular shaped hollow cutter and spaced stud members, a cross piece slidable on said stud members, a fluting die member suspended from said cross piece and disposed concentrically in said cutter, a forming cylinder in said fluting die member having a stem secured in said upper slide means, a cup die mounted on a bed plate with which said cutter coacts to sever a web blank, means for lowering the upper slide means whereby the fluting die member lowers into the cup die to form the cup blank severed by the cutter, said cup die having a sleeve portion through which the cup is forced and fluted by said forming cylinder and said forming cylinder further descending to force the shaped cup out of the die piece and into said pivoted cup carrier.

10. A machine for making and loading paper cups as defined in claim 1 wherein said pivoted cup carrier means includes an arm pivoted for free swinging arcuate vertical movement, a shaft carried in the end of said arm, a cup on one end of the shaft, a gear on the other end of the shaft, a fixed rack over which the gear operates to swing the cup carrier from upright position for receiving a paper cup from the cup forming means to inverted position over a bucket of the accumulating conveyor, air supply means carried by said arm and connected to said cup carrier through a bore in said shaft, and means for controlling said air supply means for forcing the paper cup out of the cup carrier to capping position over the bucket of said accumulating conveyor.

11. A machine for making and loading paper cups as defined in claim 1 wherein said cup righting and transfer means includes gripper support means positioned adjacent the discharge end of said accumulating conveyor comprising gripper arms for engaging the inverted cup and cookie unit, means for moving the gripper support means longitudinally, means for swinging the gripper arms arcuately to deposit the unit, including a rack and pinion combination for movement together and longitudinally during the initial pick up movement of said gripper support means and for relatively independent movement to swing said gripper arms.

12. In a machine for packaging cookies, a conveyor having open sided buckets individually carrying a stack of cookies covered by a paper cup inverted over each of said buckets and said cookies, each cup and its cookies constituting a package unit, a cup righting and transfer means positioned adjacent the discharge end of the conveyor and comprising slide means, means for moving the slide means toward and away from the discharge end of the conveyor, gripper support means on the slide means including gripper arms mounted for closing movement to grip a package unit in the conveyor, means for closing said arms rack and gear means operable upon movement of said slide means for swinging while closed the gripper support and its arm means arcuately to position the unit right end up at the completion of its swinging movement, and means for opening said arms to release said package unit.

13. In a machine as defined in claim 12, in which said rack and gear means include a device for compensating for the movement of the conveyor without operating the gripper arms when a package unit is initially engaged by said gripper arms, comprising a spring-biased slide mounting for the rack having in association therewith a stem extending from one end of the rack, fixed bearings for the rack and stem and said stem having a collar thereon, stop means on the slide means, a stop gauge pin on the rack engageable by the stop means for holding the rack with the collar spaced from a fixed bearing whereby a retractable movement of the slide means will move the pinion and rack as a unit without actuating said gripper arms until the collar engages said bearing and the pinion moves relatively with the rack to swing said arms.

14. A machine for making and loading paper cups as defined in claim 1 wherein said discharge pusher includes a pivoted arm means, means for oscillating the arm horizontally across a discharge table portion of the machine having spaced openings therein adjacent the free end of the pusher when the same is in starting position, said openings providing between them a space for supporting the righted package unit deposited by said cup righting and transfer means, a pusher strip extending forwardly from the free end of said pusher arm means for engaging the package unit, a guide strip defining a path for the package unit to an outfeed conveyor, a plunger in the arm, a plate cam, a roller on the plunger spring-biased against said cam for projecting the plunger to push a package unit off the table and into the outfeed conveyor, and said guide strip acting to propel the package unit parallel to and at the same speed as the conveyor into which the unit is to be thrust by said plunger means.

15. A machine for making and loading paper cups with crackers including infeed conveyor means for feeding cookies serially, a cross feed conveyor, a selector conveyor arranged transversely of said infeed conveyor for feed conveyor, an accumulating conveyor parallel said feeding a predetermined number of cookies to the cross feed conveyor, an accumulating conveyor paralleling said cross feed conveyor, pusher means for cross feeding cookies out of the cross feed conveyor into said accumulating conveyor, means for altering the speed of movement of the cross feed conveyor periodically, means for actuating the pusher means in accordance with the travel of said cross feed and accumulating conveyors, cup forming means, pivoted cup carrier means for transferring a cup to capping position in registry with a bucket of said accumulating conveyor to provide a packaged unit of cookies, cup righting and transfer means for lifting the inverted cup and cookie units from the accumulating conveyor bucket, and a discharge package pushing means within operating range of which is deposited, right end up by said transfer means, said cut and cookie unit for discharge.

16. In a machine for packaging cookies or the like, a transfer unit adapted to lift a unitary stack or cookies from a conveyor bucket comprising slide means, means for oscillating said slide means, arcuately swingable arms pivoted to said slide means, vertical gripper pad means pivoted on the free ends of said swingable arms for gripping a stack of cookies through the opposite sides of the conveyor bucket, means for moving said gripper pad means including bell crank arms pivoted for mutual operation, means for actuating the bell crank arms to close the grippers in package lifting and transfer operation and to open the gripper in package release and return operation, and means for operating said slide and gripper means in synchronism with the movement of said conveyor bucket.

17. In a machine for packaging cookies or the like, a cookie stack pushing means including an arm pivoted on a table of the machine adjacent a discharge end thereof for oscillating horizontal movement, a pusher extension on said arm for engaging a stack of cookies disposed on the table at the free end of said arm, a guide strip for said stack as it is pushed by said extension on an oscillatory movement of said arm, a spring-biased plunger in said arm for projectile movement, and a cam for operating said plunger to move the stack from the table at the end of an operating stroke of said arm.

18. In a machine for handling cookies or the like including an infeed conveyor along which cookies feed serially, selector conveyors spaced transverse feeding position to said infeed conveyor, and one of said selector conveyors including rectangularly disposed chain driven pusher means grouped in sections for pushing a predetermined number of cookies alternately as groups out of said infeed conveyor.

19. In a machine for handling cookies or the like, parallel conveyors having open sided buckets for cross alignment, pusher means for pushing crackers out of one conveyor into the other conveyor, means for operating both conveyors at the same speed, means for accelerating and decelerating the movement of one of the conveyors during travel comprising rectangular chain drive means, gears for clockwise and counterclockwise movement over which the chain moves, and cam controlled means for adjusting the movement of said gears in clockwise and counterclockwise direction to decelerate and accelerate respectively the movement of one of said conveyors.

References Cited

UNITED STATES PATENTS

| 2,886,927 | 5/1959 | Fisk | 53—160 XR |
| 3,117,667 | 1/1964 | Tichy et al. | 53—152 XR |
| 3,123,959 | 3/1964 | Carriere et al. | 53—161 XR |

GRANVILLE Y. CUSTER, JR., *Primary Examiner.*